INVENTOR.
Raymond G. Rushing,
BY John M. Stoudt
Attorney.

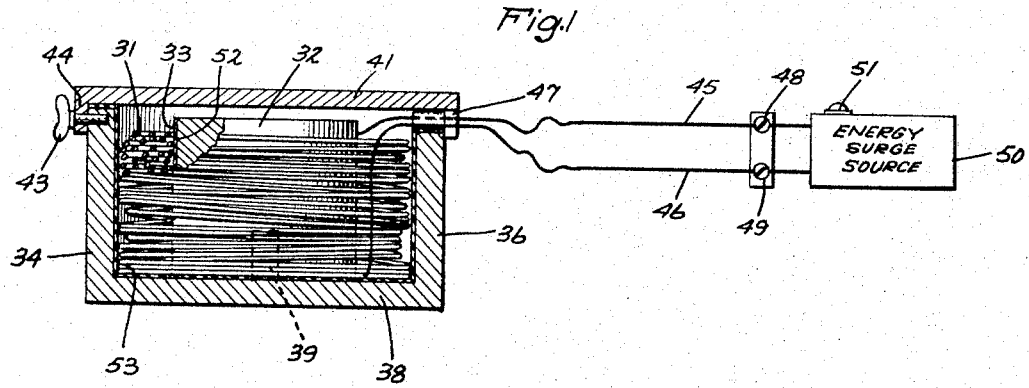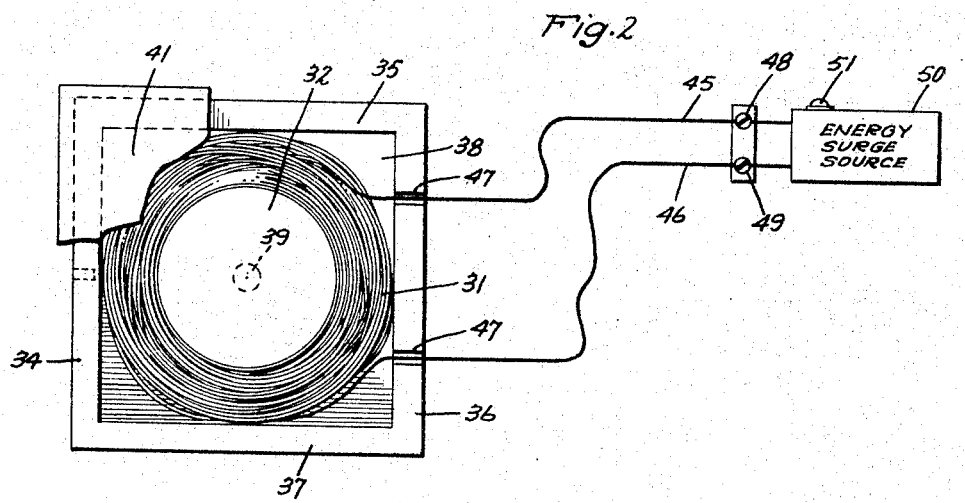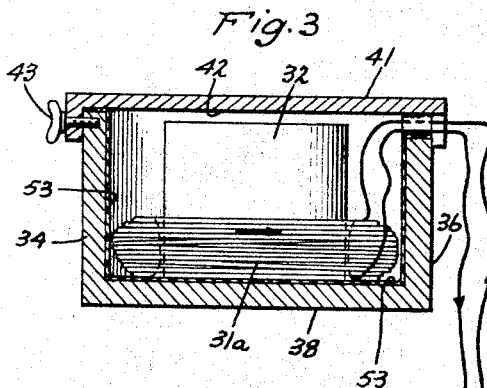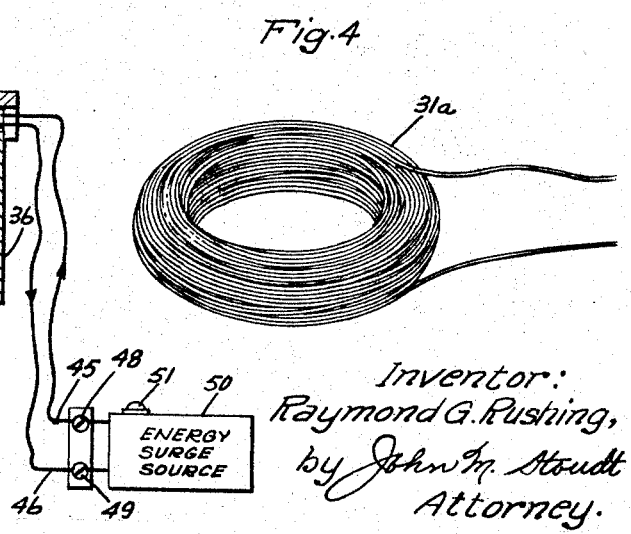

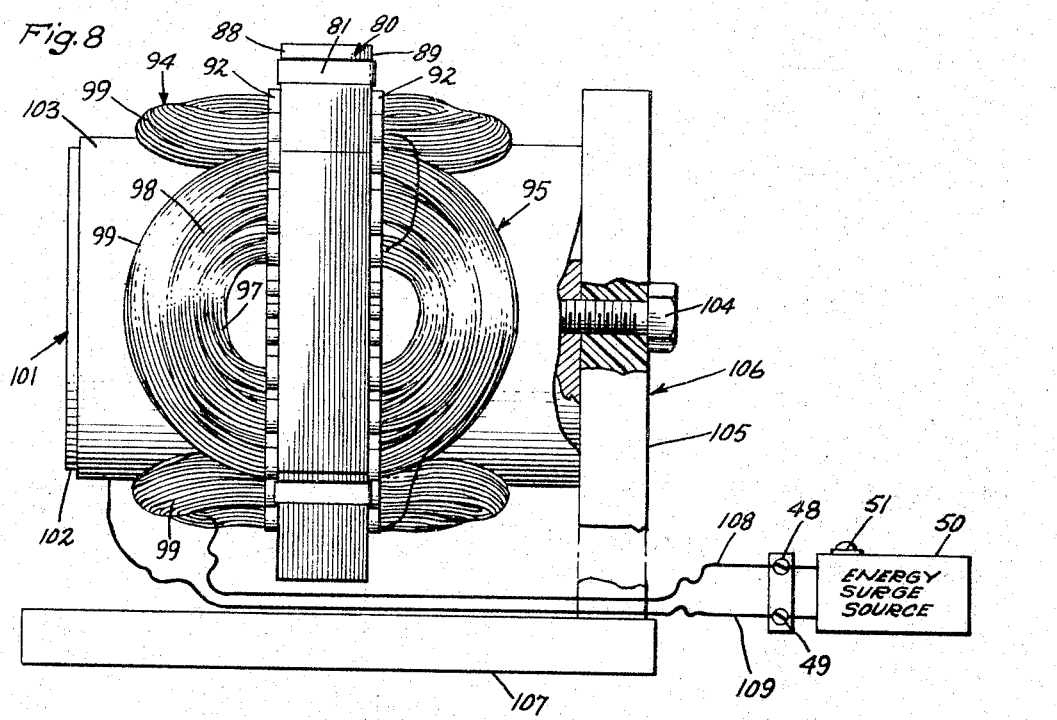
Fig. 8
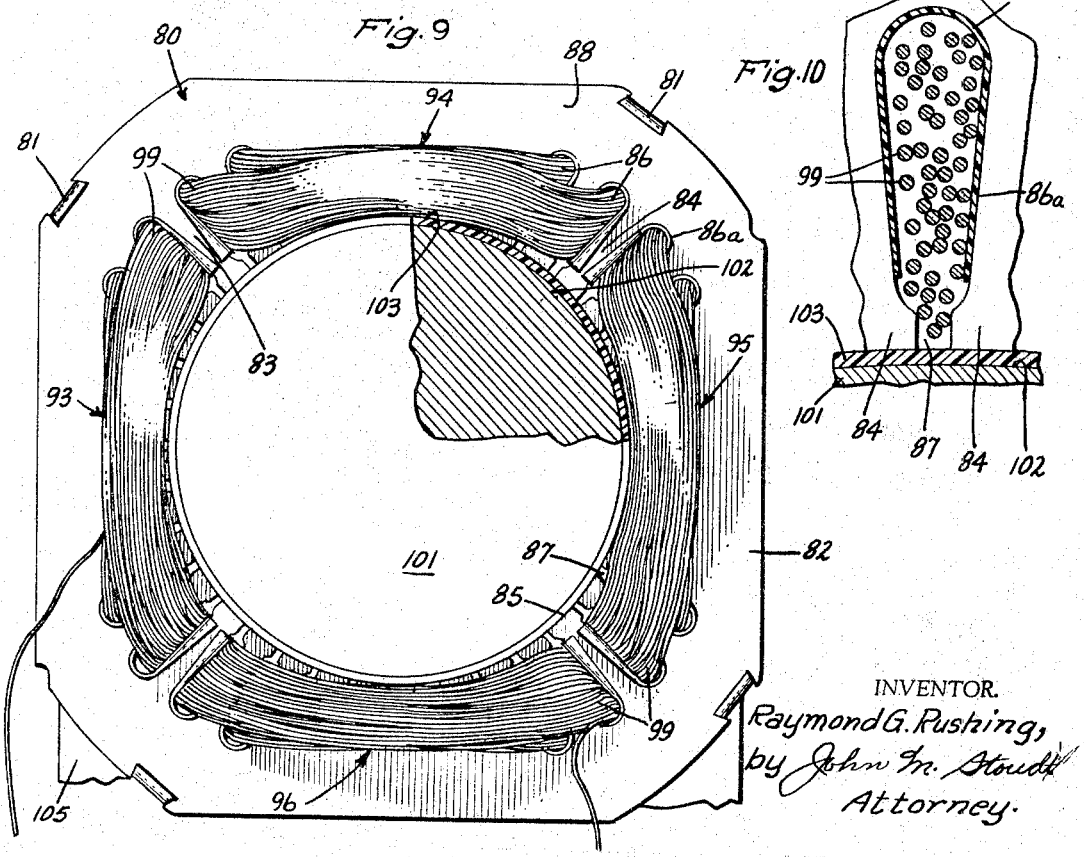
Fig. 9
Fig. 10
INVENTOR.
Raymond G. Rushing,
by John M. Stoudt
Attorney.

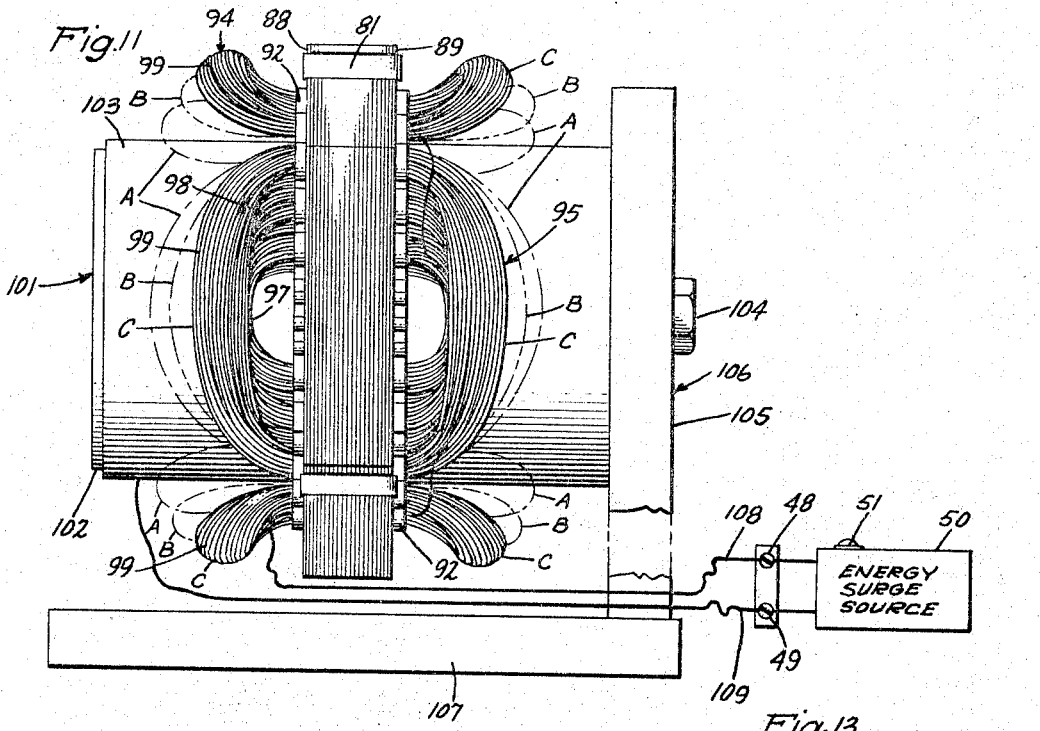
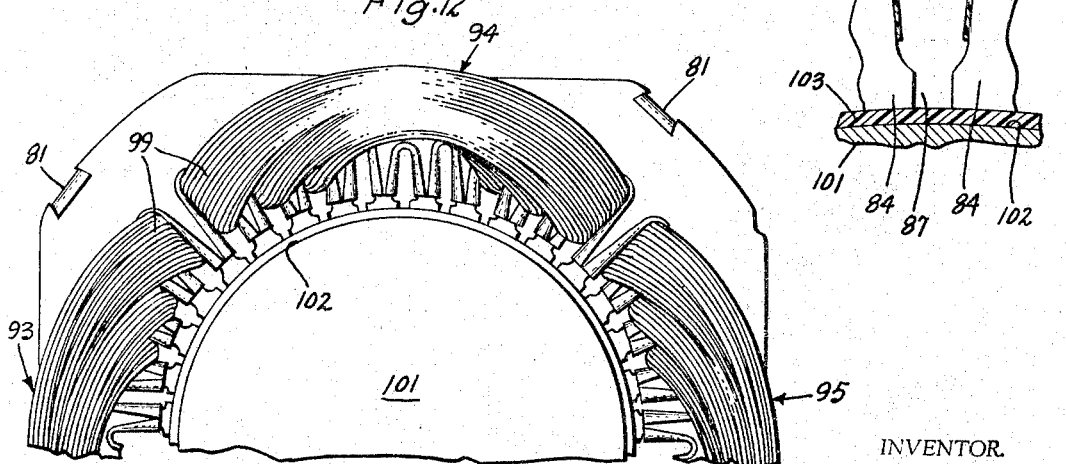

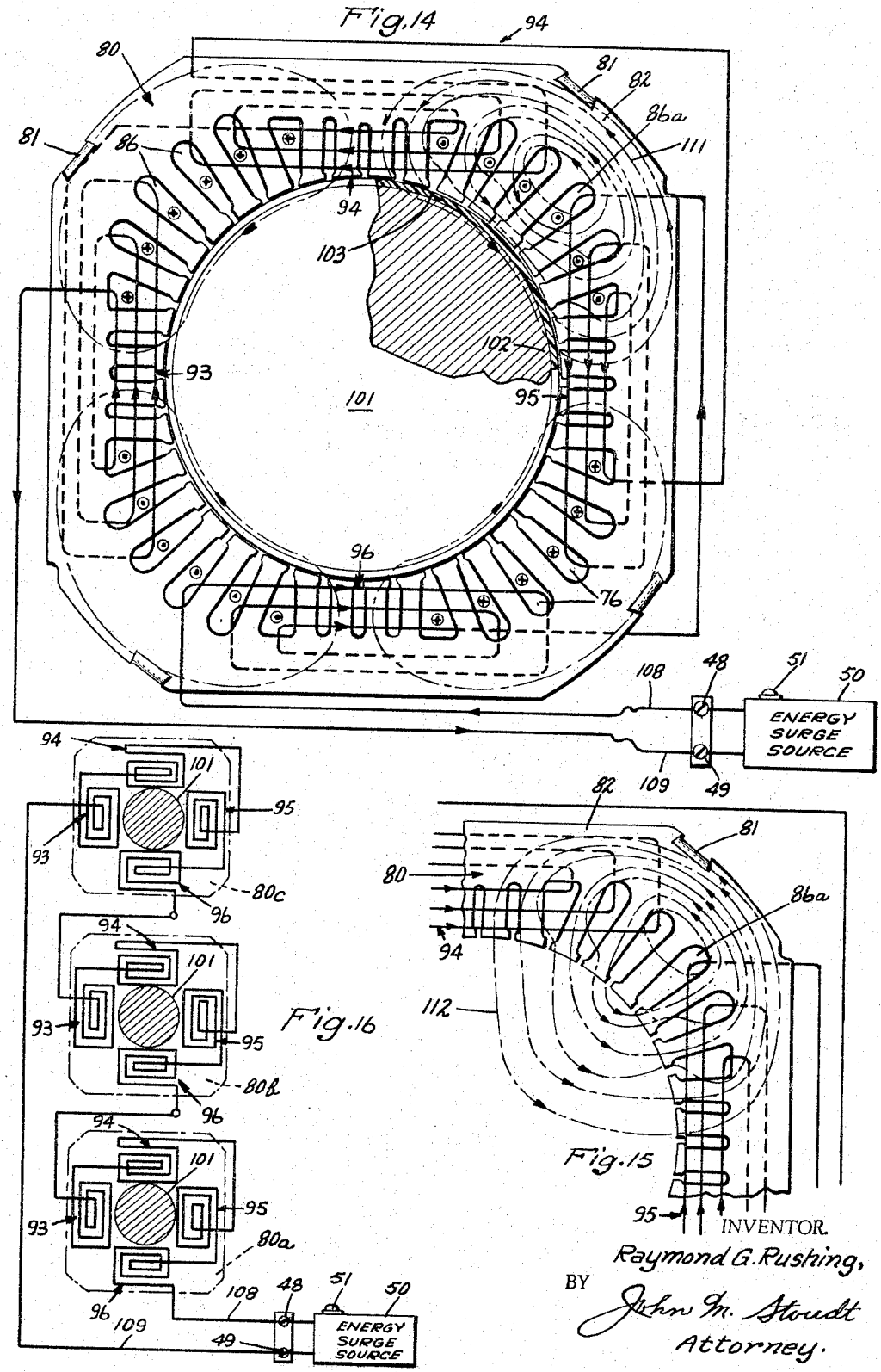

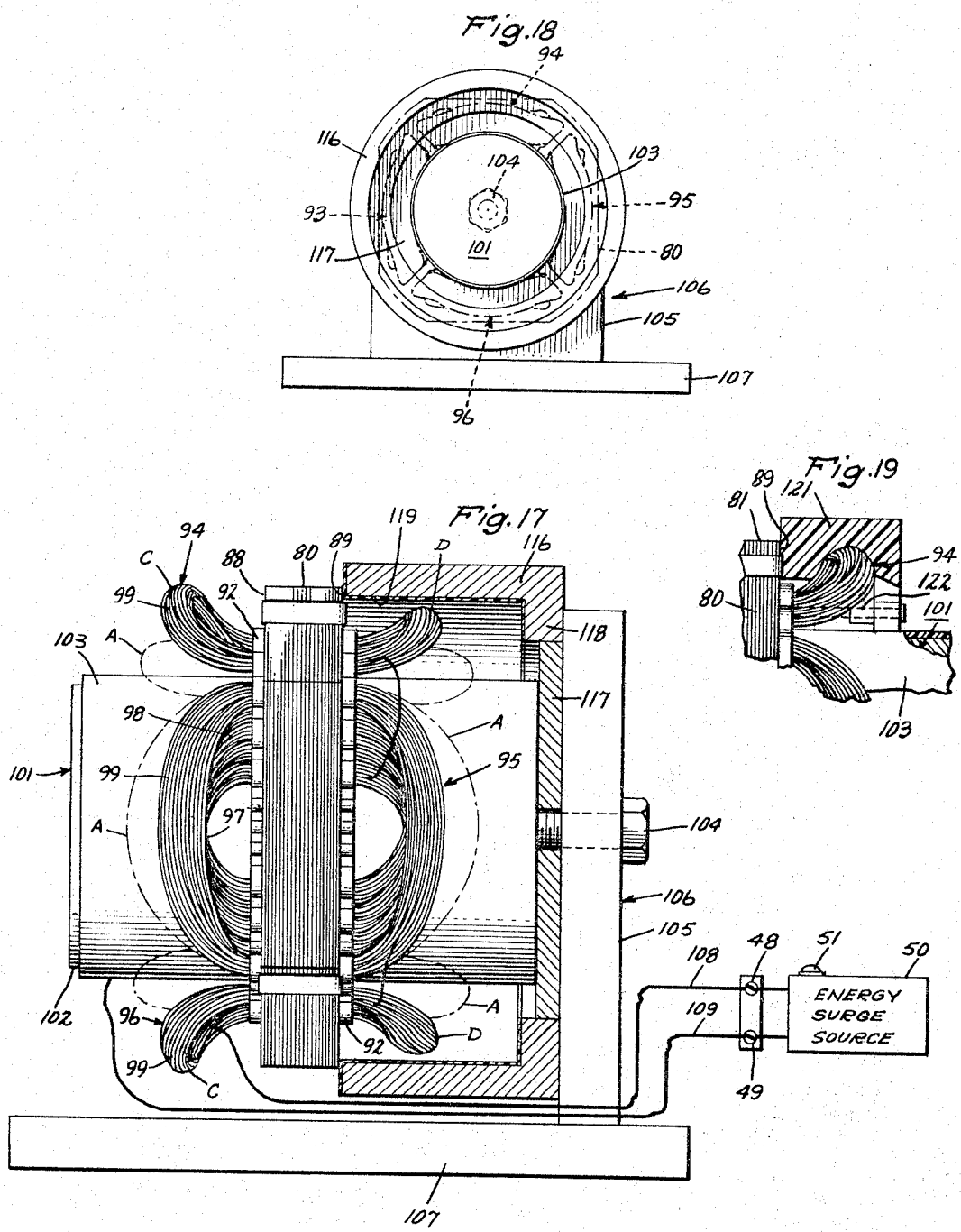

Aug. 1, 1967 R. G. RUSHING 3,333,328
METHODS FOR CHANGING RELATIVE POSITIONS OF MOVABLE
CONDUCTORS FOR USE IN ELECTRICAL INDUCTIVE DEVICES
Filed Nov. 30, 1964 10 Sheets-Sheet 7

INVENTOR.
Raymond G. Rushing,
BY John M. Stoudt
Attorney.

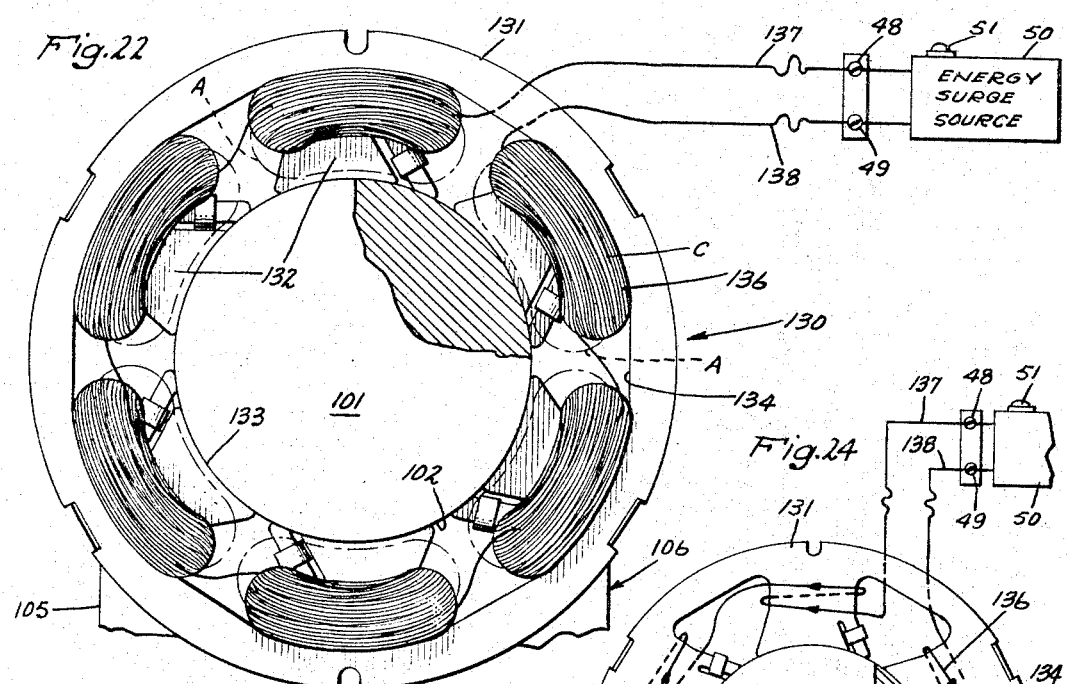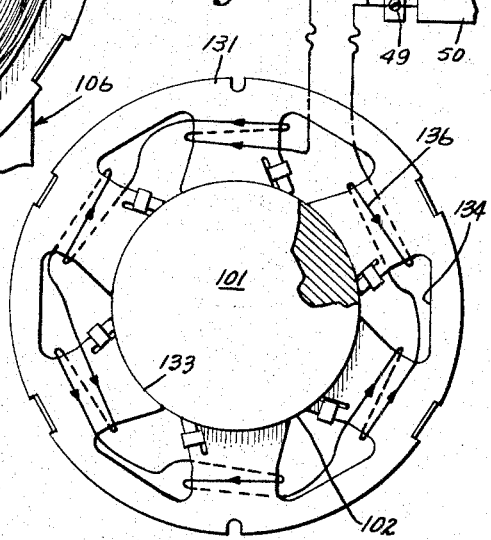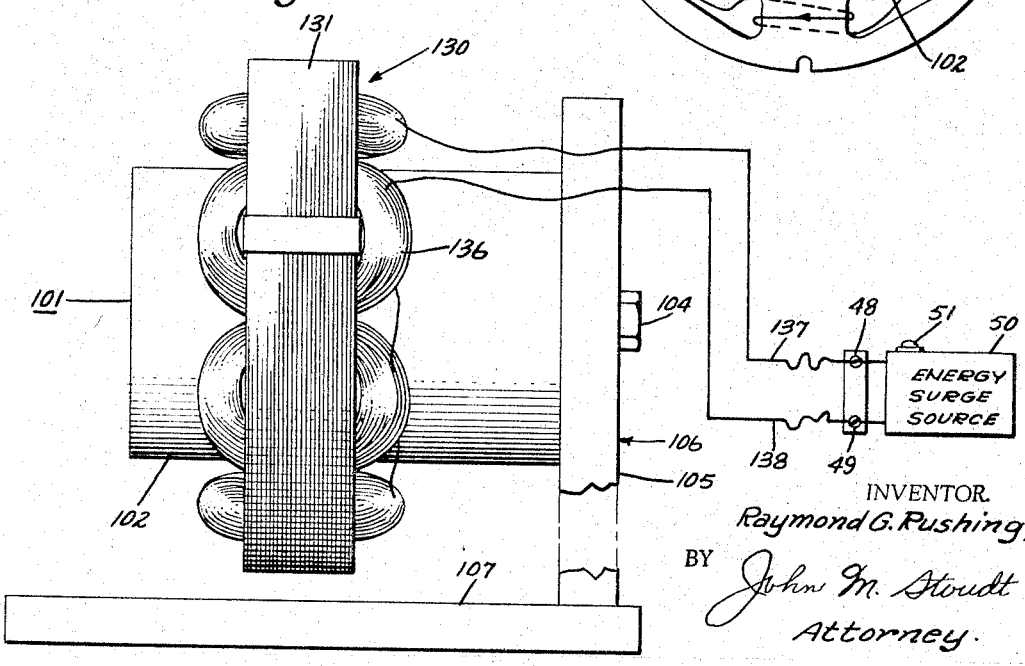

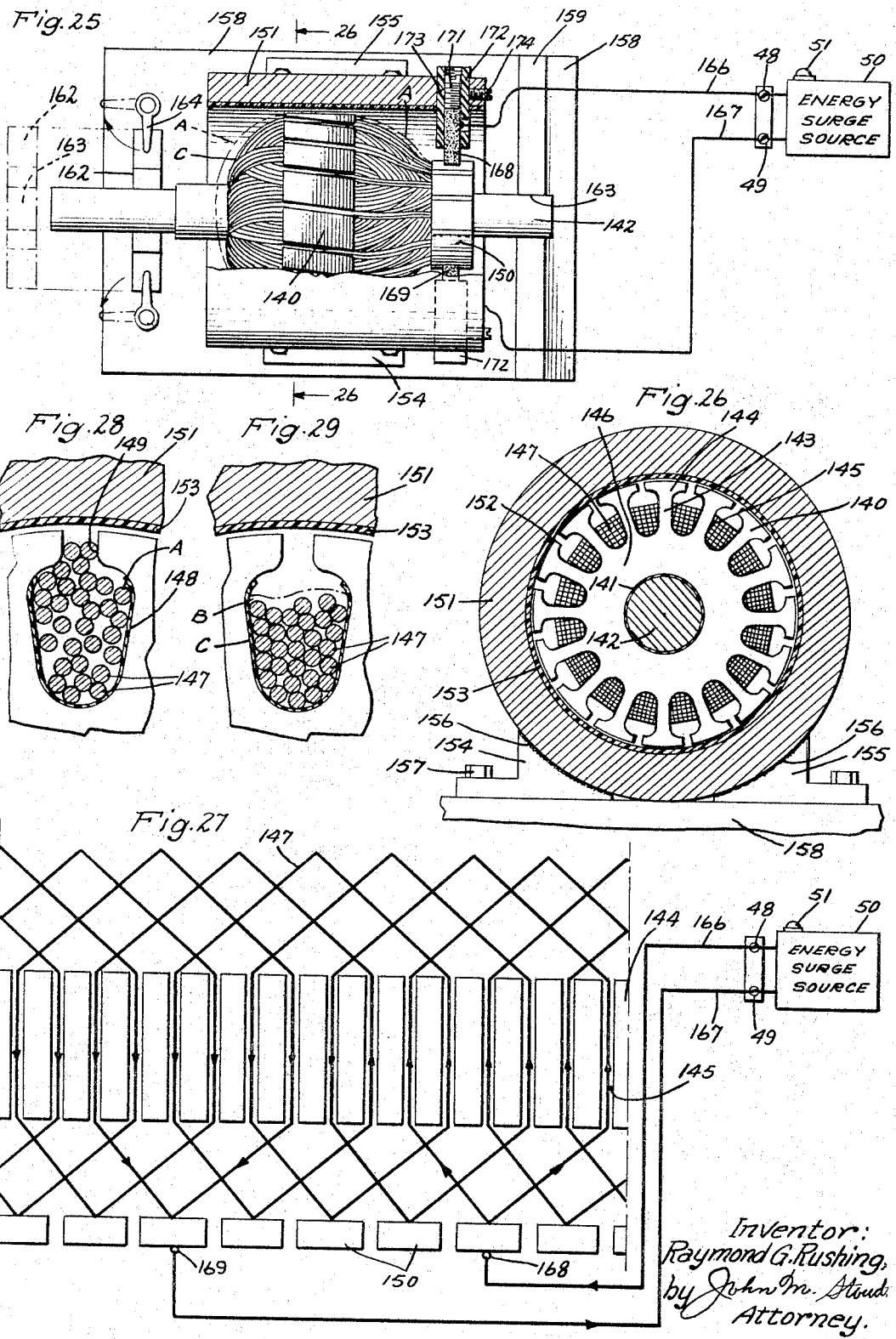

Aug. 1, 1967 R. G. RUSHING 3,333,328
METHODS FOR CHANGING RELATIVE POSITIONS OF MOVABLE
CONDUCTORS FOR USE IN ELECTRICAL INDUCTIVE DEVICES
Filed Nov. 30, 1964 10 Sheets-Sheet 10

INVENTOR.
Raymond G. Rushing,
BY John M. Stoudt
Attorney.

United States Patent Office 3,333,328
Patented Aug. 1, 1967

3,333,328
METHODS FOR CHANGING RELATIVE POSITIONS OF MOVABLE CONDUCTORS FOR USE IN ELECTRICAL INDUCTIVE DEVICES
Raymond G. Rushing, Ballston Lake, N.Y., assignor to General Electric Company, a corporation of New York
Filed Nov. 30, 1964, Ser. No. 414,826
18 Claims. (Cl. 29—596)

The present invention relates generally to methods for changing the relative positions of a number of movable conductor portions for use in electrical inductive devices. More particularly, this invention pertains to an improved method for transforming a number of insulated conductor turns from one overall configuration into electrical coils of another, suitable for use in electromagnetic devices. The present invention additionally relates in particular to an improved method for compacting and/or contouring electrical coils arranged in magnetic core components of dynamoelectric machines and the like.

Electromagnetic devices, for example relays, solenoids, and transformers, customarily incorporate at least one electrical coil wound with a number of somewhat flexible conductor turns in which adjacent turns are electrically insulated one from the other by a layer of insulation surrounding the outer surfaces of the individual conductors. The construction of these devices introduce certain considerations and problems during their fabrication.

In the interests of saving material, weight of construction, and space in the electromagnetic devices, generally speaking the conductor turns of the coil should be as compact as possible and still be satisfactorily insulated relative to each other. Further, it is highly desirable, if not essential under some circumstances, that the coil be furnished with a preselected overall size and contour, which may be dictated by the electromagnetic device in which the coil is incorporated, by a method which is versatile in nature and inexpensive to practice.

Accordingly, a general object of the present invention is the provision of an improved method for changing the relative positions of a number of movable conductor portions, for use in electrical inductive devices, into the desired positions.

A more specific object of the present invention is the provision of an improved method of compacting and/or contouring electrical coils formed of a number of insulated conductor turns without damaging the conductor insulation.

Another object of the present invention is the provision of an improved method for transforming the individual turns of a coil, suitable for use in an electromagnetic device, from one overall configuration to another having a pre-selected overall size and contour at a relatively low cost.

Briefly stated, in accordance with one aspect of the present invention, I provide an improved method of transforming a number of conductor turns from one overall configuration into an electrical coil, which is particularly suitable for use in electromagnetic devices, such as relays, solenoids, and the like. In one form of the method, selected and individually movable portions of a number of conductor turns are arranged next to a rigid structure of non-magnetic, electrically conductive material and in spaced relation to other portions. At least one surge of electrical energy having a preselected magnitude is applied directly to the conductor turns, with the energy producing an interaction between the selected turn portions and the material such that the selected turn portions are transformed into the desired configuration. By this aspect of the invention, among other features, electrical coils may be efficiently furnished with the desired compaction, overall contour, and size at a relatively low cost.

Turning now to a further aspect of the present invention, in the construction of dynamoelectric machine electrical components, such as stators for use in small and fractional horsepower electric motors which employ electrical coils for windings, other and even more difficult problems and considerations are introduced. By way of illustration, in certain alternating current, single-phase motors, the stator is provided with a magnetic core formed with a central rotor or armature receiving bore and a number of angularly spaced apart electrical coil accommodating slots having entrances at the bore. These slots carry electrically displaced main and auxiliary windings of the distributed type with the windings being respectively defined by a number of electrical coils formed of insulated wire conductor turns. It is generally accepted practice for those slots which carry coils of both windings to position the coil side portions of the main winding in the bottom of the slots, that is, next to the slot walls located away from the bore, and the auxiliary winding coil sides near the bore. The winding arrangement disclosed in Patent No. 2,812,459 granted to C. A. Smith is typical of this approach.

During the manufacture of these stators, the main winding coils are normally positioned in the slots before the coils of the auxiliary winding and are forced back, both the coil side portions in the slots and the end turn portions which project axially beyond the end faces of the core, for a number of reasons. The greater the compaction and force-back achieved for the main winding coils, the more effective use may be made of the magnetic core material, of the conductor material of the coils, and of the coil accommodating space available in the slots. In addition, main winding coil compaction and force-back of the side and end turn portions help reduce the difficulty experienced or the effort and labor expended in positioning the auxiliary winding coils in the slots without damaging the conductors and insulation. Further, there is a wide variance in the winding end turn contour and volume requirements between the various stator applications which must be compensated for during manufacture of the stators.

In an attempt to achieve the foregoing desirable results, it has been common practice, when producing such stators in the mass production manufacture of electric motors, to effect compaction and force back of the windings, especially the main windings, by methods involving physical pressure engagement between mechanical equipment and the outer surfaces of the winding coils. Unfortunately, this pressure contact approach has inherent disadvantages and has not been entirely satisfactory for a number of reasons. For example, the mechanical techniques employ pressure directly against the coil side portions in the slots to force the portions toward the bottom of the slots. In forcing back the winding end turn portions radially away from the bore and axially toward the core end faces, either a hand operation using rubber mallets or machines employing mechanical pusher elements which make pressure contact with the end turn portions are normally utilized. This physical pressure contact made with the coil turns, regardless of the type of mechanism used, has a tendency to abrade, chip, or otherwise damage or adversely affect the conductor insulation and may even produce cuts in the wire conductors. Another disadvantage with the mechanical approach is the low degree of compaction which can be satisfactorily obtained. Further, the procedure has been inherently expensive to practice and there has been a practical limitation on the type of winding which can be compacted, regardless of degree of compaction, due at least in part to the shape and size of the coil accommodating slots carrying the winding and to the capabilities of the equipment.

It is therefore an object of this invention to provide an improved method for compacting into a more concentrated mass at least one electrical coil formed by a number of conductor turns having a portion disposed in a magnetic core or other coil accommodating structure.

It is a more specific object of this invention to provide an improved yet relatively low cost method for compacting in an effective and efficient manner the side portions of at least one electrical coil formed of individual conductor turns accommodated in the slots of a dynamoelectric machine core.

It is yet another object of this invention to provide an improved method for moving coil side portions of insulated conductor turns accommodated in the slots of a dynamoelectric machine stator core toward the bottom of the slots in which they are received and for forcing back the end turn portions of the coils away from the stator bore without damaging either the insulation or the conductor turns.

It is still another object of this invention to provide an improved and versatile method of transforming dynamoelectric machine winding coils from one configuration to another which produces at least some, if not all, of the desirable features mentioned above and overcomes the difficulties and disadvantages associated with prior procedures employing mechanical coil engaging equipment.

In carrying out this aspect of the present invention, in one form I provide an improved method for compacting a winding accommodated by the slots of a dynamoelectric machine magnetic core fabricated of ferromagnetic electrically conductive material. The winding is formed of a plurality of electrical coils connected in circuit relation, with each coil being defined by a number of loose, insulated conductor turns providing coil side portions which reside in the slots and coil end portions which project axially beyond the end faces of the core. According to the form of the method, a generally non-magnetic and rigid electrically conductive structure capable of conducting eddy currents, is positioned in the vicinity of the winding coils and at least one surge of electrical energy, having a preselected magnitude below the intensity at which the insulation is deleteriously affected, is applied to the coils such that current flow through the conductor turns of a given coil in the same direction is produced and transient eddy current flow is created in the structure. These currents establish opposing flux which react to effect transfer of the individual conductor turns away from the rigid structure and toward the bottom of the slots, compacting the individual coil side portions into a dense mass and forcing back the end portions into the desired contour.

This method is not only simple and economical to practice, but in addition, is capable of producing improved results in the degree of compaction obtained without adversely affecting the electrical insulation and conducting qualities of the conductors. In particular, this aspect of the invention makes it possible to effectuate compaction and forceback of coils, both in the slots and at the ends of the core, without the necessity for expensive and complex mechanical equipment such as that having pusher elements which apply a pressure directly against the outer surfaces of the coils during the forceback operation. Consequently, potential damage to the insulation of the coil turns has been greatly reduced by the present invention while at the same time, greater compaction of the turns in the slots and desired force-back of the end turns have been achieved. These latter features are quite beneficial in making available more space for an auxiliary winding and permit more efficient installation of the auxiliary winding on the core. In addition, the coil end turn volume and final contour can be readily controlled and varied depending upon the required application. Other advantages and attributes of the invention will become more apparent as the description proceeds.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawings in which:

FIG. 1 is a schematic view, partially in cross-section and partially broken away, of equipment for carrying out the transformation of a random wound coil from one configuration into another in accordance with the method embodying one form of the present invention, the coil being shown in position prior to its compaction and in circuit connection relation to a power or energy surge source suitable for supplying preselected electrical energy impulses or surges to the coil;

FIG. 2 is a schematic plan view, partly broken away to show details, of the exemplification seen in FIG. 1;

FIG. 3 is a schematic view corresponding to that of FIG. 1, except that the random wound coil is illustrated subsequent to its transformation by the method of the present invention;

FIG. 4 is a perspective view of the coil of FIG. 3 after it has been disconnected from the energy surge source and removed from the equipment seen in FIGS. 1-3 inclusive.

Figure 5:
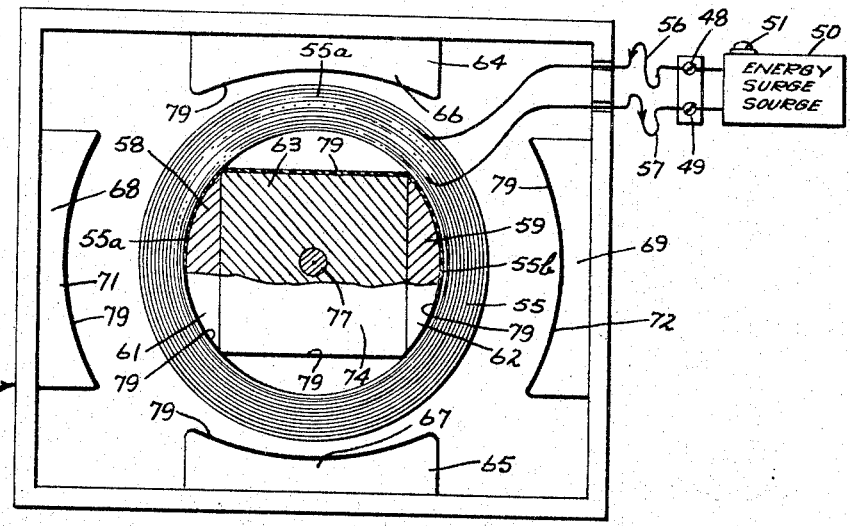
FIG. 5 is a schematic view of an arrangement for transforming a precision wound electrical coil from one configuration to another in accordance with another form of the method of the present invention, the coil being shown connected in circuit relation to an energy surge source of the same type utilized for the exemplification of FIGS. 1-4 inclusive.
Figure 20:
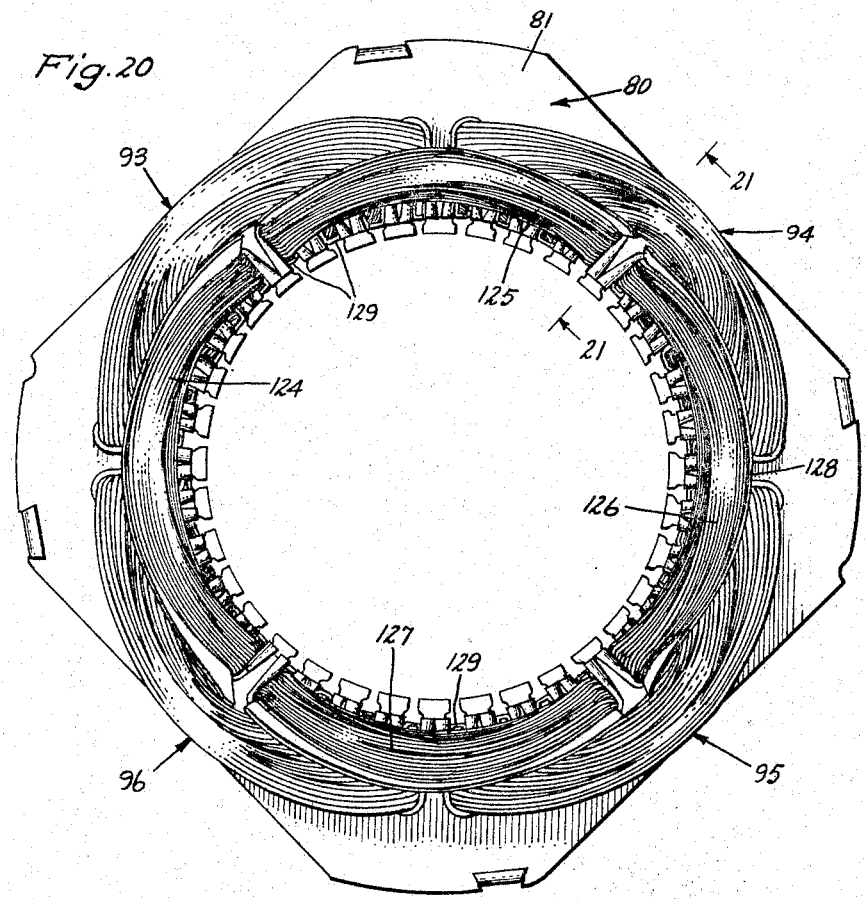
Figure 21:
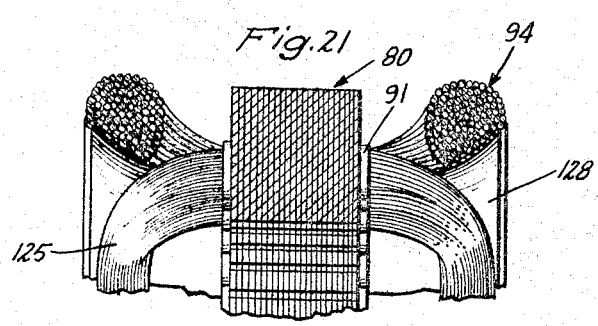

FIG. 8 is a side elevational view, partially broken and partially in schematic, showing equipment which may be employed in the compaction and press-back contouring of electrical coils by another aspect of the present invention, the coils of this exemplification forming a winding of the distributed type in a dynamoelectric machine stator core and being shown before transformation in FIG. 8 as accommodated by the core and serially connected to the energy surge source capable of supplying the requisite electrical energy surges thereto for carrying out the method;

FIG. 9 is a slightly enlarged end view, partially broken away, of a part of the equipment, the stator core, and the end turns of the winding coils shown in FIG. 8;

FIG. 10 is an enlarged fragmentary cross sectional view of one of the slots, coil side portions, and associated regions of the core and equipment seen in FIG. 9;

FIG. 11 is the same as FIG. 8 except that the coil has been compacted in accordance with one form of the method incorporating the present invention;

FIG. 12 is a slightly enlarged end view of approximately one half of the stator core, coil end turns, and part of the equipment illustrated in FIG. 11, the view corresponding to that seen in FIG. 9 to reveal the compaction and press-back of the coil end turns effected by the method of this exemplification of the present invention;

FIG. 13 is the same as FIG 10 with the exception that the typical relative positions of the coil side portions in the core slots are shown subsequent to the compaction of the winding coils by the method of the present invention;

FIG. 14 is an end view of the stator core, coils, and equipment seen in FIGS. 8-13, with the coil distribution and their connections to the power source illustrated diagrammatically, and with a general flux pattern established by the coils during their compaction being revealed schematically for coil side portions in two adjacent polar regions of their respective magnetic poles;

FIG. 15 is a schematic diagram of a fragmentary portion of the stator core and of the coils seen in FIG. 14 representing the general flux pattern created in the same polar regions shown in FIG. 14 under situations not incorporating electrically conductive material;

FIG. 16 is a schematic circuit diagram of three stator windings showing them in series connection with a suitable power source for concurrently compacting the coils of all the illustrated windings in accordance with the method of the present invention;

FIG. 17 is a side elevational view, partially in section and partially schematic, of the stator core and winding used in the exemplification of FIGS. 8-14 inclusive, showing equipment for augmenting the compaction and controlling the finished contour of the coil end turns achieved by one form of the method embodying the present invention;

FIG. 18 is an end view of the equipment shown in FIG. 17 with the stator being removed;

FIG. 19 is a fragmentary side view of a portion of the stator core and winding end turns seen in FIG. 17 to show another way of controlling the final contour of the end turns during their compaction by the method of the present invention;

FIG. 20 is an enlarged end view of the completed stator of the exemplification, having main and auxiliary windings compacted and contoured by the method of the present invention;

FIG. 21 is a view taken along line 21—21 in FIG. 20;

FIG. 22 is an end view of a salient pole stator incorporating coils forming a concentrated type winding in series circuit connection to the electrical energy surge source, the view revealing the change of position or transformation of the coils effected by the method of the present invention;

FIG. 23 is a side elevational view of the stator shown in FIG. 22, the view illustrating equipment, including a schematic circuit representation of the winding connection to the power source;

FIG. 24 is an end view of the core of the exemplification of FIGS. 22 and 23, with the coil distribution and connection to the power source shown diagrammatically;

FIG. 25 is a plan view, partially broken away, and a schematic circuit of one arrangement which may be used to compact winding coils of a wound armature or the like by my invention;

FIG. 26 is a sectional view taken along the line 26—26 in FIG. 25;

FIG. 27 is a developed winding and circuit diagram for the arrangement shown in FIG. 25;

FIG. 28 is an enlarged fragmentary cross-sectional view of one of the armature slots and associated regions of the core and equipment seen in FIG. 26, the view illustrating the coil conductors prior to their compaction;

FIG. 29 is the same as FIG. 28 except that the positions of the coil conductors in the slots are shown subsequent to compaction by the method of the present invention; and FIG. 30 is a circuit diagram depicting a typical electrical energy source for generating high energy surges of short duration which may be employed in practicing the method of the present invention.

Turning now to the drawings in more detail and in particular to FIGS. 1-4 inclusive, for the purpose of explaining one aspect of my invention, I have shown the first embodiment of my method in connection with the transformation into the desired final configuration of individually movable or flexible turns of an electrical coil adapted for use in such electromagnetic devices as relays, solenoids, transformers, and the like. The coil of the exemplification is shown in FIGS. 1 and 2 before the method of the present invention has been carried forth and is denoted by numeral 31. It is initially formed by a predetermined number of loosely distributed turns, random wound from a continuous length of electrically insulated wire conductor material, such as common enameled copper or aluminum wire having a circular cross-section.

In applying one form of the present method to coil 31, equipment such as that illustrated in FIGS. 1-3 inclusive may be utilized. In the illustrated form, individual conductor turns of coil 31 encircle a rigid structure of nonmagnetic, electrically conductive material, by way of example, a solid cylinder 32 composed of diamagnetic copper, aluminum, or the like, with the radially innermost turn portions of coil 31 being arranged adjacent the outer longitudinal surface 33 of the cylinder. The non-magnetic cylindrical structure 32 and the encircling coil 31 are disposed within a generally box-like enclosure having four side walls 34, 35, 36, 37 and a bottom wall 38 in the manner seen in FIG. 1. Preferably, for the reason to be explained hereinafter, walls 34, 35 of the enclosure are formed of ferromagnetic material, such as iron or certain steels, to provide an open ended construction. For centering coil 31 and cylindrical structure 32 within the confines of the enclosure and for retaining the structure in a fixed position, a stationary upright stud 39 or the like projects upwardly from bottom wall 38 and enters a complementing hole located in the bottom end of the cylindrical structure 32 (as viewed in FIG. 1). A flanged cover plate structure 41 fabricated from nonmagnetic, electrically conductive rigid material, such as diamagnetic copper, is assembled over the free edges of side walls 34, 35, 36 and 37. The inner surface 42 of plate 41 is thus situated in spaced adjacent relation both to the uppermost turns of winding 31 and to the upper end of cylinder 32 with the plate 41 being held firmly in place by a winged pin 43 which removably extends through aligned apertures of cover plate flange 44 and enclosure wall 34. The coil terminations 45, 46 project through appropriate openings 47 in enclosure wall 36 and in the flange of plate 47 to be accessible for connection to a suitable energy source.

In carrying out the method of the present invention to coil 31 of the exemplification, coil lead terminations 45, 46 are connected in series circuit across output terminal connectors 48, 49 of a power or energy source, generally indicated by numeral 50, capable of supplying an electrical energy surge of preselected magnitude to the coil 31. The insulation on coil terminations 45, 46 must be cut through, scraped off, or otherwise removed to produce a good electrical contact between the bore conductor at the coil termination and the associated terminal connector. In order to supply a preselected energy surge to coil 31, a pushbutton switch 51 is connected in the circuit of the energy source for initiating actuation of the source 50. As will be explained in more detail hereinafter, depression of the pushbutton for switch 51 actuates a circuit for charging a capacitor bank to a selected voltage level which is regulated by a variable control autotransformer. Thereafter, the capacitor bank is discharged and a surge of electrical energy, as controlled by the voltage level on the capacitor bank, is applied to coil 31 across output terminal connectors 48, 49.

The application of the energy surge to coil 31 produces a surge of current flowing in the same direction through the individual turns at any given location and, as I understand the action, transient eddy current flow is established in rigid and conductive structures 32, 41, in the vicinity of their outer surfaces 33, 42, which are arranged adjacent predetermined portions of coil 31, that is, next to the inner turns and uppermost turns respectively of the exemplification. In addition, opposed magnetic fields are set up by the rapid surge of current flow in coil 31 and structures 32, 41. The interaction of the current flow and opposing electromagnetic fields of flux transfer the individual coil turns from their initial positions of FIGS. 1 and 2, where the turns are rather loosely distributed, to the positions shown in FIG. 3, where the individual turns are transformed into a generally annular coil 31a having the turns compacted into a dense mass providing a somewhat circular overall coil cross-section. In other words, the surge of electrical energy in coil 31 and the opposition created at surfaces 33, 42 exert forces on the turns, especially those portions adjacent the structures 32, 41, to impart momentum to the turns individually away from the fixed non-magnetic surfaces 33, 42 respectively toward bottom wall 38 and transform them in slightly over 80 microseconds into the finished coil 31a of FIGS. 3 and 4 having the desired generally annular configuration.

During this rapid action and reaction, it is believed that the ferromagnetic enclosure walls, if provided with sufficient mass, function as a positive path in the vicinity of the turns for carrying the flux and concentrating it near the final turn positions to augment the coil compaction which occurs. If desired, the interior surfaces of the ferromagnetic enclosure walls could be shaped with a suitable curved contour to assist in the transformation of the turns into a coil having a circular cross-section configuration. If properly curved and dimensioned the interior wall surfaces would restrain the rapidly moving outer coil turns, both at the bottom wall 38 and at the nearby interior surfaces of walls 34, 35, 36 and 37 to augment compaction of the turns into a tight bundle. To prevent grounding or arcing of the energized turns with adjacent structure, it is advantageous to furnish suitable dielectric material between the radially inner coil turns and structure 32, as indicated at 52, as well as between the outer coil turns and the exposed interior surfaces of the enclosure walls as denoted by number 53. The insulation may take any form, for instance, cured dielectric epoxy resin adhering to the surfaces, electrical tape, sheet material of polyethylene terephthalate, or the like.

The preselected electrical energy magnitude mentioned above in connection with the surge should be of sufficient intensity to accomplish the desired transformation, but must be below the intensity which will deleteriously affect or break down the insulation covering the individual coil turns. Further, the magnitude should not unnecessarily affect the conductivity qualities of the conductor turns and for most conditions, a magnitude which does not damage the insulation will not adversely affect the conducting quality of the conductor turns. It will be obvious to those skilled in the art that the total number of surges to be employed and the preselected surge magnitude chosen for a given application to produce a level of force sufficiently great to effect the desired action on the conductor turns, are dependent upon such variable factors as: wire conductor turn size and composition; inherent resistance of the turn to transfer and number of turns; initial relative positions of turns to each other and to the non-magnetic electrically conductive material; final coil configuration desired; turn insulation composition; among others.

The following two examples are given in order to show more clearly how the method as described above for the exemplification of coil 31 has been carried forth in actual practice. The enameled coil turns were approximately one-hundred in number having the wire distributed in the loose and random relation as revealed in FIGS. 1 and 2. In addition, structures 32, 41 were solid copper with the cylinder diameter being 1.625 inches and its length being 1.688 inches.

In the first example, the wire conductor turns were formed of copper having an overall nominal diameter of 0.033 inch and a bare wire nominal diameter of 0.030 inch. The enamel insulation covering the individual turns was a polyvinyl formal resin. The capacitor bank had a capacitance of 360 microfarads and the magnitude of the energy surge was preselected at 750 joules. Consequently, the capacitors were charged to a selected voltage in accordance with the expression $E = \frac{1}{2}CV^2$ where:

$E$ = desired energy in joules
$C$ = capacitance of capacitor bank in farads
$V$ = selected voltage on the bank in volts Thus, in the above example, the selected voltage was 2040 volts. The 750 joule energy level was sufficiently high to effect the desired compaction of the coil as shown in FIGS. 1–4 inclusive but was below the intensity at which the insulation or copper wire turns were adversely affected. The inside nominal diameter of the finished coil 31a was in the neighborhood of 2 inches. The insulative and conductive characteristics of the coil were completely satisfactory.

In the second example, the wire conductor employed was aluminum, with an overall nominal diameter of 0.043 inch and a bare wire nominal diameter of 0.040 inch. A selected voltage of 1622 was used in connection with the 360 microfarad capacitor bank to produce electrical energy of 480 joules which was applied to coil 31 without adverse affects, yet achieved the desired compaction of the coil turns into coil 31a of FIGS. 3 and 4.

It will be apparent to those skilled in the art from the foregoing description that the equipment revealed in FIGS. 1–3 inclusive may take other forms than that illustrated to carry out the method of the present invention. For instance, structure 32 which is shown in those figures as a solid cylinder could readily be provided in the form of a sleeve adjacent the inner turn portions of coil 31, the sleeve having an adequate thickness to conduct transient eddy current flow next to its outer surface.

It will be further appreciated from the improved method described in regard to FIGS. 1–4 that the transformation of the conductor turns into a more compact and definite configuration not only is inexpensive to practice, but is also versatile in nature. Further, the final configuration of the coil can be determined in advance and a preselected overall size and contour achieved, with a resulting economy in the material employed for the coil as well as a low weight coil, and with a saving of space required to accommodate the coil in the electromagnetic device in which it is ultimately incorporated. All of the foregoing advantages and features are attained without adversely affecting the quality of either the turn insulation or the conductive characteristics of the coil.

Figure 6:
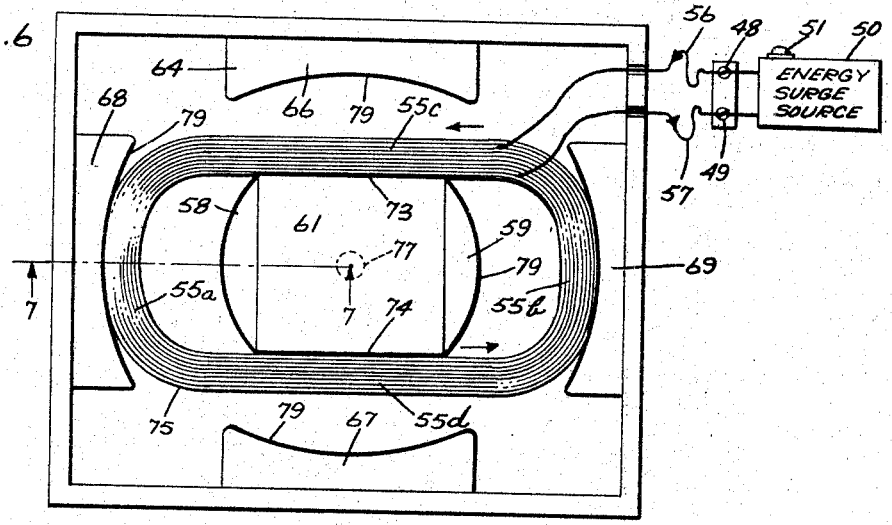
FIG. 6 is a view similar to FIG. 5 illustrating the coil after its contour has been changed by the present invention.
Figure 7:
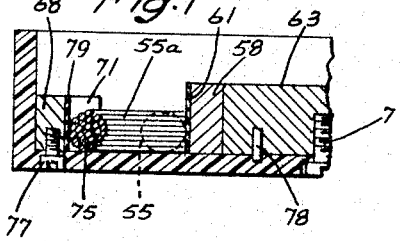
FIG. 7 is a view taken along line 7—7 in FIG. 6.

FIGS. 5, 6 and 7 show a second embodiment of the present invention as applied to the transformation of a precision wound type coil from one overall configuration into another. Like the coil of the first exemplification, it is adapted for use in relays, solenoids, transformers, and the like. However, unlike coil 31a, in its initial form, denoted by numeral 55 in FIG. 5, the coil in the second exemplification is defined by a number of insulated wire conductor turns distributed in side by side compact relation in a precise and well-known way to provide a coil of annular configuration having a circular total cross-section at any given location of the coil. The coil terminations 56, 57 are serially connected to output terminal connectors 48, 49 of energy surge source 50 as previously explained for the first embodiment of the invention.

Referring now specifically to FIG. 5, which pictures the coil turns in their initial positions before the present invention has been carried out, it will be seen that predetermined portions of the coil turns, that is, certain parts of the innermost turns designated at 55a and 55b in FIG. 5 are arranged next to rigid non-magnetic and electrically conductive material or structural elements 58, 59, e.g., copper, of a structured member arranged within the confines of the coil turns. Preferably, the outer surfaces 61, 62 of elements 58, 59 are convex, being generally complementary in a transverse direction (as viewed in FIG. 5) to the curvature adjacent coil portions. An element 63 of ferromagnetic material, formed with a rectangular cross-section, separates materials 58, 59 from each other while joining them into a unitary structure and also acts as a flux concentrator somewhat in the manner of the enclosure walls in FIGS. 1–3. Certain other parts of the outermost turns, indicated at 55c and 55d, are respectively disposed adjacent other rigid non-magnetic and electrically conductive material 64, 65 have outer surfaces 66, 67 respectively facing core portions 55c, 55d provided with a concave transverse curvature (as viewed in FIG. 5).

Rigid structures 68, 69 of ferromagnetic material are positioned in spaced relation to structural elements 58, 59 and, as will be seen more clearly below, have transversely curved concave surfaces 71, 72 respectively facing coil portions 55a and 55b which serve as retaining walls for restraining the rapid movement imparted to these coil portions. A pair of opposed walls 73, 74 of element 63 also serve in this capacity for coil portions 55c, 55d. It should be noted at this time that all of the structural elements 58, 59, 63, 64, 65, 68, and 69 are fixedly mounted or anchored in an open ended enclosure 76, formed of thermoplastic or thermosetting material, as by screws 77 and pins 78 (FIG. 7). Further, in order to prevent potential arcing between these elements and coil 55, surfaces exposed to coil 55 of these elements should be suitably insulated, as indicated by numeral 79 in the figures of this exemplification.

Turning now to consideration of the method of the second embodiment and the way in which the above-described equipment may be used to transform coil 55 from its initial configuration into the finished coil denoted by numeral 75 in FIG. 6, a surge of electrical energy having a preselected magnitude is applied to coil 55 across terminal connectors 48, 49 of source 50 after the push-button of switch 51 has been depressed in the manner already described for coil 31 of the first exemplification. A current surge is generated in coil 55, the current flowing through the individual coil turns in the same direction as indicated by the arrows in FIG. 6. This, in turn, establishes surging transient eddy current flow in adjacent non-magnetic structural elements 58, 59, 64, and 65, with the current flows creating opposing electromagnetic fields of flux at those locations. Consequently, as the action and interaction are understood by me, the current flow and opposing electromagnetic fields of coil portions 55a, 55b and the adjacent elements 58, 59 react to create repulsion forces which impart momentum to the individual turns away from their associated non-magnetic structure. With respect to coil portions 55a, 55b, they are transferred rapidly into impact against the respective restraining walls of ferromagnetic elements 68, 69 which effect sudden deceleration of the coil turns at that location. Obviously, the exact linear dimension between surfaces 68 and 69 will determine the major axis for finished coil 75 and the part of the resulting coil configuration. In like fashion and concurrent therewith, coil portions 55c, 55d and associated non-magnetic elements 64, 65 achieve an interaction which transfers the coil portion from the positions shown in FIG. 5 to those revealed in FIG. 6, where they are forced against and make impact with surfaces 73, 74 of element 63.

As the above interactions and transfers are being accomplished and the transition is taking place from the annular coil 55 of FIG. 5 to the finished coil 75 having the oblong contour seen in FIG. 6, the current surge in the coil turns and resulting forces have a tendency to maintain the side by side compact relation of the individual turns during their transfer to their final positions. It is believed that impact against surfaces 71, 72, 73, and 74 will aid in the maintenance of the compact turn relation. Further, the ferromagnetic nature of elements 63, 68, 69 should augment the action by furnishing positive flux paths and a concentration of flux next to the positions where certain portions of the coil will be disposed after the coil transformation has occurred. Moreover, by forming the non-magnetic structural elements outlined above with the various curved surfaces, maximum benefits are derived in the force level that can be exerted on certain predetermined portions of the coil during the transition for a given energy input level. It will be understood by those skilled in the art that the method of the second embodiment and the principles involved may be used with other types of coils to obtain a final coil configuration other than the one shown which is presented merely as an exemplification. Moreover, the advantages of the second embodiment are basically similar to those outlined for the first embodiment of FIGS. 1–4 inclusive.

In order to explain another aspect of the present invention, FIGS. 8–21 illustrate the preferred form of my improved method in connection with the fabrication of a dynamoelectric machine stator of the type disclosed in United States Patent No. 2,795,712 granted to Fred W. Suhr on June 11, 1957. FIGS. 8, 9 and 10 depict the stator of the exemplification at the stage in its fabrication before the method of the present invention has been carried out. More specifically, as shown in these three figures, a magnetic stator core 80 is comprised of a number of laminations stamped from relatively thin (e.g., .025 inch in nominal thickness) ferromagnetic, electrically conductive sheet material secured together in stacked relation by any suitable means, such as several spaced apart groove and key arrangements extending across the outer periphery of the stack, indicated generally at 81. The stator core includes a yoke section 82 and a plurality of angularly spaced apart teeth sections 83 projecting radially inward from the yoke section which terminate at their inner ends in enlarged tooth lips 84 defining a central rotor receiving bore 85. In the core of the exemplification, there are thirty-six teeth sections, with adjacent teeth sections defining between them a corresponding number of angularly spaced apart, open ended, slots 86 having the general configurations illustrated in the Suhr patent and better seen in FIG. 14 of the drawings. Each slot communicates with bore 85 through a restricted slot entrance 87 and extends the axial length of the core being open at end faces 88, 89 of the core. A standard, generally U-shaped slot liner 91 composed of suitable electrical ground insulation, such as polyethylene terephthalate sheet material, is provided in each slot next to the wall for the usual insulation reason and has a cuffed end 92 extending slightly beyond the associated end face of the core 80 in an axial direction.

It should be noted that the stator core shown in FIGS. 8, 9, and 10 has the main field winding already accommodated on the slots of the core. In the exemplification, the main field winding is of the distributed type and is defined by four identical coil groups 93, 94, 95, and 96 with each group being formed by three serially connected concentric coils symmetrically disposed about a polar radial center and indicated by numerals 97, 98, and 99 referring respectively to the innermost, intermediate, and outermost coils of each group. Each coil is wound of a predetermined number of enameled wire conductor turns formed of electrically conductive material; e.g., aluminum, copper, or the like, having a suitable relatively thin coating of electrical insulation adhering to the outer surface of the turns.

The main field winding of the exemplification, prior to its transformation by the present invention, has the side portions of the respective coils received in selected slots with the end turn portions, which join a pair of side portions together, projecting axially beyond the slots as best shown in FIG. 8. The winding and insertion operations for disposing the coils on the core in the illustrated manner may be accomplished in any convenient way, as for example, by the winding machine disclosed in United States Patent No. 2,836,204 issued to Lowell M. Mason on May 27, 1958.

Still referring to FIGS. 8, 9, and 10, it will be seen that after the insertion operation, the individual conductor turns of the coil side and end portions have a relatively loose relation. In this regard, FIG. 10 depicts slot 86a in FIG. 9 and the typical, relative positions of the conductor turns for a coil side portion of one of the outermost coils 99 in coil group 94. The picture is representative of the turn distribution in all of the slots of core 80. These turns are rather loosely distributed within the confines of the slot in a somewhat random fashion, with the slot liner 91 electrically insulating the turns from the slot walls. However, since the legs of the standard U-shaped slot liner 91 conventionally terminate short of the slot entrance 87, several of thhe conductor turns located near the entrance are exposed to and engage the adjacent uncovered slot wall.

In applying my invention to the stator core and main field winding of the exemplification and referring to FIGS. 8 and 9, a rigid structure of non-magnetic, electrically conductive material, such as diamagnetic copper, or aluminum, is arranged radially beneath the coil end turn portions and inwardly of the coil side portions. In the illustrated form, the structure comprises a solid unitary cylinder 101 having a circular outer peripheral surface 102 provided adjacent the radially inner turns of the individual coils for their entire axial length, with the axis of the core and cylinder being substantially coaxial.

At this stage in the stator fabrication, due primarily to the turn distribution in the slots, there is a general tendency for the radially inner coil turns, both at the slot entrances and in the end turn portions, to be urged toward the axis of the core. In order to prevent potential arcing between these turns and cylinder 101 during the practice of my invention, it is desirable to furnish electrical insulation having insulated regions disposed between surface 102 and the adjacent coil portions. The insulation may take any suitable form; however, as shown in FIG. 8, I prefer to use a separate and stiff sleeve or tube 103 of pressed fiber or the like disposed between the inner edges of the tooth lips of the core and the outer surface 102 of cylinder 101. With this latter approach, the tube may be slid into the bore of the core immediately after the coil insertion operation but prior to assembly of the core with cylinder 101. Thus, the tubular insulator also functions as a means for retaining the coil side portions in the slots and the end turn portions temporarily out of the bore until the coils have been transformed from one overall configuration into another by this aspect of the present invention.

When utilizing the illustrated solid cylinder 101 of FIGS. 8 and 9 as the non-magnetic material adjacent the radially inner coil turn portions, it is convenient to use the cylinder in support of the stator core, which preferably has its longitudinal axis arranged horizontally so that no other support is required. In actual practice, I have employed a supporting construction in the manner shown in FIG. 8. One end of the cylinder 101 was secured by a bolt 104 to an upright bracket 105 of an L-shaped stand 106 formed of thermoplastic insulating material. The mounting arrangement should, of course, provide adequate space for accommodating the core 80 and for permitting the desired movement of the coil end turn portions.

In the exemplification of my invention under consideration and still referring to FIG. 8, main winding terminations 108, 109 are serially connected across the output terminal connectors 48 and 49 of energy surge source 50. As in the other embodiments, pushbutton switch 51 is depressed to initiate operation of the source and an impulse or energy surge of preselected magnitude is supplied to the main field winding. As in the previously described embodiments, depression of the pushbutton of switch 51 energizes the energy surge source 50 by first charging a capacitor bank to a selected voltage level and then by discharging the electrical energy of the capacitor bank in the form of a sudden energy surge of preselected magnitude through the conductor turns, the individual coil groups 93-96 inclusive of the main field winding in this exemplification.

It will be recalled from the preceding description of stator core 80 and FIG. 10 that several of the conductor turns carried in the slots are in direct contact with the slot walls near thhe slot entrance 87. Under these conditions, it is desirable to employ a first high energy surge of relatively lower magnitude than would otherwise be selected for application to coil groups 93, 94, 95 and 96 at the outset. As best seen in FIGS. 11 and 13, the interaction between the non-magnetic cylindrical turns to transfer the individual coil side portions away from structure 101 and into a more compact bundle situated toward the bottom of the slot, position B shown by the broken line in FIG. 13, where the slot liner 91 is effective to insulate all of the turns from the core walls to prevent possible arcing or grounding of the turns at higher levels of energy. At the same time the end turn portions of the coils are transferred from their initial positions "A," shown in FIG. 11 by broken lines, into intermediate position "B" where they are forced back radially away from structure 101 and axially toward their associated end faces into a somewhat compacted end turn bundle.

A second surge of electrical energy of greater preselected magnitude than the first but below the intensity at which the insulation of the turns is deleteriously affected is then applied to the coil groups by re-setting the voltage level on the capacitor bank to a higher value and repeating the operative cycle for actuating the energy surge source. This causes an interaction between the coils and non-magnetic structure 101 which produces forces acting upon the coil turns to transfer them into positions "C" revealed in full in FIGS. 11, 12, and 13.

The coil side portions, as best seen in FIG. 13 where the compacted turns are shown for slot 86a which is representative of the other slots, are forced tightly against the bottom slot wall away from the bore of the core into a compact mass. The term "slot wall" as used herein is intended to include the slot insulation in whatever form. The final disposition of the end turn portions for the various coil groups is best seen by the full lines in FIG. 11, the positions referenced by letter "C" where the end turn portions are more compact and disposed closer to their associated core end faces 88, 89 than when in their intermediate positions, "B." This dramatic coil transformation illustrated by FIGS. 11, 12, and 13 clearly demonstrates the compaction and final configuration achieved, both in the side portions and end turn portions of the coil groups, by my invention. These figures also accurately portray the space made available at those locations, radially beyond the bore, for accommodating the coils of an auxiliary winding which may be conveniently compacted or otherwise transformed by the method of this invention.

A consideration of FIGS. 14 and 15 is helpful in explaining the way in which I believe the coil turns of the exemplification are transformed by my invention from their initial positions shown in full in FIGS. 8, 9, and 10 to the desired and final winding configuration shown in FIGS. 11, 12 and 13. In FIG. 14, the four main field winding coil groups 93-96 inclusive are schematically illustrated on core 80. The customary symbols indicate an assumed direction of current flow through the individual turns of the coils after the application of the sudden surge of electrical energy to the coil groups. The symbol $\oplus$ evidences the direction of current flow through the coil turns in a given slot downwardly into the drawings, while symbol $\odot$ indicates the current flow through the coil turns in an upwardly direction toward the viewer.

When the coil turns of the winding are subjected to the sudden surge of electrical energy, the current flow through the individual turns comprising a given coil is in the same direction. The current surge through the side portions of the winding coils sets up a flux pattern in the polar regions of adjacent poles in the fashion revealed by the broken lines 111 and arrows in FIG. 14 for contiguous regions of coil groups 94 and 95. The pattern is typical of that for the other conterminous polar regions of the coil groups. The current flow through the coils causes transient eddy current flow to be conducted at the outer surface of the non-magnetic cylindrical structure 101 such that the flux is intensified or magnified across the slots and at the tooth sections in the vicinity of structure 101 where it is of greater density or strength than at the bottom of the slots disposed away from the bore.

It is believed that prior to saturation of the core, the sudden current flow in the coil turns and the transient eddy current flow in structure 101 establish opposed magnetic fields, with the interaction of the current and fields producing forces which act upon the individual turns, imparting momentum to the side portions radially toward the slot bottom and to the end turn portions away from the rigid structure 101. In particular, the yoke section 82 at the bottom of the slots furnishes a significant ferromagnetic mass for providing a positive path to carry the flux in the illustrated concentrated pattern. During the unsaturated condition, the flux strength across the slots and adjacent tooth sections next to structure 101 will be greater than at the bottom of the slots and due to the ineraction referred to above, the conductor turns experience forces on them in the slots in a radially outward direction away from the structure 101. Once saturation is reached for the core, the individual turns in a given coil are drawn together by mutual attraction into a compact mass but will still try to move as a bundle in the direction of increasing inductance, that is, toward the bottom of the slots. During this time, the conductor turns, especially those portions in the slots, realign from their original random distribution, as dictated by the energy surge into the final relative positions best illustrated in FIG. 13. These relative positions approximate the ideal positions for the turns during their excitation under operating conditions, reducing their tendency to be under stress when excited for operation.

The turn side portions in the slots finally make impact with the slot walls which prevent or restrain further transfer of the side portions away from the structure 101. This sudden deceleration experienced by the coil bundle in the slots augments the compaction of the side turn portions. Depending upon the magnitude of the surge among other factors referred to hereinafter, the end turn portions continue to move radially beyond the bottom of the slot walls and axially toward the associated side faces of the core. Since saturation of the core takes place quite rapidly and the entire period of coil transformation has been timed in actual practice as occuring in slightly over 80 microseconds, the preceding actions and reactions probably happen almost concurrently.

The unusually high force level achieved by the present invention for a given application may be better appreciated by a comparison of the flux pattern just described and shown in FIG. 14 with that depicted in FIG. 15, where electrically conductive material is not used adjacent the coils in the bore. In the latter figure, the same conterminous polar regions of coil groups 94, 95 are illustrated as shown in FIG. 14; however, during the energy surge applied to the coil groups, no non-magnetic structure is employed whatsoever. It will be seen from FIG. 15 that the flux pattern produced by the energy surge, without the electrically conductive structure, provides a flux path 112 through the ambient air toward the center of the core, indicated by the broken lines and arrows, which results in a loss of usable energy and a corresponding loss in active force. By contrast, by my invention, for a given energy input into the winding, I am able to derive a substantially higher force level reacting with the coil turns by virtue of the flux recaptured for active use and the magnetic field intensification provided, among other things.

The following two examples are given merely for the purpose of illustrating how the method of this aspect of the invention has been actually carried forth in accordance with the illustrated exemplification. For ease in identification, identical numbers will be used for the examples as are employed in the illustrated exemplification. In both examples, source 50 included a capacitor bank with a total capacitance of 360 microfarads, the cylindrical structure 101 was fabricated from copper, and the pressed fiber insulator 103 in the bore of the core 80, was .070 inch in radial thickness. Each core and accommodated winding of the examples were constructed in accordance with the illustrated exemplification of FIGS. 8–14 inclusive, the core having a nominal bore diameter of 3.481 inches, corner to corner nominal dimension of 6.291 inches, and thirty-six slots 86.

In the first example, a number of cores were provided with a stack height of 1.288 inch and a winding wound from enameled copper wire conductor turns having a nominal bare wire diameter of 0.0453 inch and a nominal insulated total diameter of 0.0456 inch. The turn insulation was a coating of polyvinyl formal resin. A single stator core will be included below which is representative of the others. It had a winding weighing approximately 1.64 pounds and an original total resistance in the neighborhood of 1.30 ohms at an ambient temperature of twenty-five degrees centigrade. Coils 97, 98, 99 had a turn distribution of twenty-three, twenty-nine, and thirty-four turns respectively. For reasons already given, a first relatively low energy surge of 480 joules was applied to coil groups 93, 94, 95, and 96, transferring the coils to positions "B" shown in FIGS. 11 and 13. To obtain the 480 joule energy surge, a voltage level of 1622 volts was selected in view of the capacitance value of the capacitor bank.

Subsequent surges of at least 1080 joules (2450 volts), 1920 joules (3260 volts), and 3000 joules (4075 volts) were applied until the coil groups assumed the "C" positions shown in full in FIGS. 11 and 13. From a visual inspection of the winding, although there was little additional compaction of the turns in the slots between the 1920 and 3000 joule surges, there was a barely perceptable difference in the force-back of the end turn portions. Generally speaking, the higher the energy surge, the greater will be the compaction and the radial and axial force-back of the coil end turn portions.

No damage to either the insulation or conductor turns was discovered from a visual examination of the winding coils after completion of the method. Moreover, from a physical examination of the coils made immediately after each surge, no significant temperature rise in the coils was discerned and they were cool to the touch. In view of the negligible heat loss, most of the input energy to the coils was expended in doing the desired coil conformation. A resistance reading by the well-known "bridge" technique was taken after the application of the last energy surge and, as measured under ambient temperature conditions of 25 degrees centigrade, the winding had a resistance of 1.23 ohms. An additional high potential test (Hi-Pot) at 2000 volts was completed on the coils in accordance with the National Electrical Manufacturers Association (NEMA) standard MG–1–12.03, dated Nov. 17, 1949. All tests showed that the transformation into the desired final configuration for the coil groups had been completed in a satisfactory way.

In the second example, a number of stator cores 80 were built with a nominal stack height of 0.988 inch. The coil groups were wound from enameled aluminum wire having a bare wire nominal diameter of 0.038 inch and an insulated total nominal diameter of 0.041 inch. The insulation was polyvinyl formal resin as in the first example. In one stator which is typical of the others, the weight of the wire was 0.46 of a pound and included an original resistance at an ambient temperature of 25 degrees centigrade in the range between 3.72 and 4.13 ohms. The turn distribution for coils 97, 98, and 99 was thirty-one, forty-one, and forty-seven respectively.

An energy surge of 1460 joules at a selected voltage level of 2850 volts was applied to the coil groups from energy source 50 after the winding turns had first been moved slightly away from the slot entrances by hand so that the slot insulation 91 was located between all turns and the core. This surge transferred the windings from their initial positions A (broken lines) directly to those positions illustrated in FIG. 11 by the letter C. Similar tests to those outlined for the first example were conducted on the transformed coils and the results were satisfactory in every respect. For instance, the resistance reading under ambient conditions was 3.95 ohms, well within the accepted range, and the Hi-Pot test proved to be entirely acceptable.

It will be recognized from the specific examples just given and the foregoing explanation and description of the stator exemplification that one or more high surges of electrical energy may be required for a given coil application to obtain maximum results with my invention in achieving the desired coil transformation. The factors affecting the preselected magnitude and the number of surges include those already presented in connection with FIGS. 1 and 3. The exact relative positions of the coil turns and the non-magnetic structure 101, as well as the contour of structure 101, the magnetic mass of the core, the overall force-back of the end turn portions desired, the end turn mean length, and the type of slot insulation employed, are considerations which also have a bearing, to one degree or another, on the number and magnitudes of the surges to be used for a particular application. For instance, if integral slot insulation were employed or if the coil turns located adjacent the slot entrance were forced back sufficiently into the slots, away from the bore, during the insertion operation, a single high surge of energy may be all that is required, depending upon the other factors involved.

Quite obviously, in the practice of the present invention, and still referring to stator core 80 and its main winding of the exemplification, a single coil of any coil group could be connected across the energy surge source 50 to attain the desired coil transformation, or any number of the coils and coil groups could be energized concurrently. However, for mass production utilization of my invention, it is highly advantageous to connect several windings in series circuit relation across output terminal connectors 48, 49 for a single energy surge source 50 as revealed in FIG. 16 and shown by the serial connection of separate windings for three stator cores 80a, 80b, and 80c. This arrangement not only expedites the transformation of the winding coils, but in addition, tends to reduce the voltage drop and dielectric stress across each stator winding for a given level of energy input from source 50. It also increases the life expectancy of source 50 in view of the fewer cycles of operation necessary to attain the desired results.

For those stator applications which require more refined control of the final end turn configuration for the winding coils than results from the step by step procedure outlined above, an arrangement illustrated in FIGS. 17 and 18 may be employed in connection with the practice of my improved method. In these figures, identical parts and components already described are identified by like reference numerals. It will be assumed for the purpose of illustration that the application requires a greater degree of end turn compaction at one side of the core, e.g., at end face 89, than for the other side. Rigid non-magnetic and electrically conductive material is therefore disposed entirely around the end turn portions at one side of the core except between end face 89 and the associated end turn portions, during the excitation of the coil groups by the energy surge of preselected magnitude from source 50.

This arrangement takes the form of cylindrical structure 101, and in addition, a flanged, non-magnetic sleeve 116 of copper, aluminum, or the like which is disposed in spaced and adjacent relation radially beyond the end turn portions at end face 89 of the core. A non-magnetic disc 117, having a press-fit with inturned flange 118 of sleeve 116, mounts the sleeve in the proper and fixed position on stand 106. Suitable electrical insulation 119 is furnished over the surfaces of sleeve 116 exposed toward both core 80 and the winding end turn portions. FIG. 18 shows the end view of the non-magnetic structures 101, 116, and 117 in the assembled relation. Broken lines depict the core 80 carrying the unformed winding in place on the stand ready for the application of my invention.

With respect to FIG. 17, when the surge of electrical energy is supplied to the coil turns, the end turn portions disposed at core end face 88 are transferred from positions A to C in the fashion already set out. However, the end turn portions at end face 89 are transformed into a more compact mass and assume position "D" by virtue of the interaction produced by the current flow in the turns, the transient eddy current flow in the adjacent non-magnetic structures 101, 116 and possibly 117, and the opposing fields which are created by the energy surge and the adjacent non-magnetic structures.

Another form for controlling the final end turn configuration for the winding coils during their transformation by my improved method is seen in FIG. 19 where an annular, two-piece shaping die 121, having the desired contour and hinged at 122, is fixedly held next to core end face 89 near the end turn portions. Consequently, when the turns are excited with the high energy surge, the end turn portions will be forced back or driven against the die and, due to the impact and the shape of the die wall, the desired additional control of the compaction and configuration may be readily obtained.

It will be recognized from the foregoing discussion that it is now practical for many slotted magnetic core applications to eliminate entirely the use of expensive and complex equipment normally required to force-back the coil turns by pusher elements, which engage the outer surfaces of the coils. Potential injury to the insulation of the turns resulting from abrasions and the like is thus greatly reduced over the mechanical approaches while at the same time, the desired coil transformation is attained quickly, efficiently, and economically by my invention. Further, the excellent control afforded of the overall coil configuration, including the degree of compaction obtained, is a definite improvement over the past approaches known to me, thereby permitting better material utilization in regard to both the core and to the coil turns. Moreover, with specific reference to stator applications, another important feature of the invention is the space made available at each end face of the core and in the slots for accommodating other windings radially beyond the bore of the core.

This latter feature is clearly shown by FIGS. 20 and 21 where a finished stator is revealed, including stator core 80 of the exemplification and the transformed coil groups 93, 94, 95, and 96 accommodated in the bottom of the slots. Coil groups 124, 125, 126, and 127 of an auxiliary winding are carried by core 80 beneath the main winding and radially beyond the bore where they will not interfere with the rotation of the rotatable assembly of the motor in which the stator will eventually be incorporated. Also, the standard in-between phase insulators 128, the coil groups of the auxiliary winding, and the usual slot wedges 129 at the slot entrances 87, are easily assembled onto core 80 due to the space made available for them. Additionally, if desired, the number of turns in either the main or auxiliary winding may be increased.

Among other advantageous features, the method of the present invention is highly versatile in nature and the same equipment may be used in the coil transformation with any number of different coil and core constructions, such as polyphase motor windings or the concentrated type winding illustrated in FIGS. 23, 24 and 25. In this regard, the same equipment shown in FIGS. 8–13 may be utilized for the illustrative concentrated winding of FIGS.

23–25, except that, as will be seen below, insulator 103 is not employed between non-magnetic structure 101 and the adjacent conductor coil turns. The magnetic stator core 130 illustrated in the latter three figures is of the salient pole variety, formed with a yoke section 131 and a number of salient pole teeth sections 132 terminating in arcuate shaped tips 133 which together define a stator bore. A corresponding number of slots 134 are provided which accommodate the conductor turn sides of coils 136 of the concentrated winding. Integral insulation, formed over the slot walls and the end faces of the core, electrically insulates the coil turns from the core. Only one coil 136 is carried by each salient pole and is random wound from enameled wire directly on the neck of the salient pole section where they each assume a position A next to the bore shown in FIG. 22. The radially inner portions of the turns are spaced from outer surface 102 of structure 101 so that there is little tendency for grounding or arcing between the turns and structure 101. Consequently, insulator 103 of the previous exemplification is not required. Winding terminations 137, 138 are connected across the output terminal connectors 48, 49 of energy surge source 50.

Upon operation of the energy surge source to deliver a preselected energy surge to the turns of coils 136, an interaction is produced such that the electromagnetic forces act upon the turns of the coils to transfer them away from structure 101 and toward the bottom of the slots into final portions C illustrated in FIGS. 22, 23. From these figures, it will be seen that the transformation, although maintaining the coil turns in a compact relation for each coil, did not force-back the end turn portions of the individual coils axially toward the core end faces as in the previous exemplification with core 80. Axial end turn force-back is not required for the concentrated winding of core 130, since in their final positions, the end turn portions are disposed radially away from the bore to avoid possible conflict with rotating motor parts, and coils 136 are the only ones which are accommodated in the enlarged slots 134 of the core. In addition, winding pins, normally projecting axially away from the salient poles to retain the coil turns outwardly from the bore, are no longer essential either during the winding operation or thereafter.

FIGS. 25–29 inclusive illustrate the method of my invention being embodied in the coil transformation of a wound armature having a core, generally indicated by numeral 140, formed from a number of magnetic laminations secured together in stacked relation. Adhesive epoxy resin 141 (FIG. 26) attaches the core to a central shaft 142. A number of angularly spaced apart teeth sections 143 terminate in enlarged lips 144 at the periphery of the cores and define between them a similar number of slots 145. A yoke section 146 joins the teeth sections together inwardly of the slots. A plurality of coils 147, each wound from a number of enameled conductor wire turns, are deployed in the slots in the lap wound fashion to define a two pole, short pitched arrangement diagrammatically developed in FIGS. 27. Only one coil side portion is carried by any one slot to provide the short pitch for the core. Suitable slot insulation, e.g., U-shaped slot liners 148 seen in FIGS. 28 and 29, electrically insulate the turn side portions from the slot walls for a major part of the wall surfaces, with the exception of the regions near the slot entrances 149 which communicate with the outer circumference of core 140. End turn portions of the coils project axially beyond each end face of core 140, one set of the end turn portions being electrically attached to commutator bars 150, which in the exemplification are one half of the number of coil slots.

The rigid non-magnetic and electrically conductive structure in the exemplification is in the form of an open-ended cylindrical sleeve or tube 151 and preferably extends the entire axial length of the winding coils 147. The inner surface 152 of the sleeve contains a layer of electrical insulation 153. A pair of spaced L-shaped brackets 154, 155, one leg secured by a weld 156 to the outer periphery of the sleeve and the other leg fastened by bolts 157 to a base plate 158, firmly support sleeve 151. Base 158 also fixedly mounts two upright supports 159 and 162, one near each end of sleeve 151, to hold the armature core within the confines of the sleeve. An arcuate shaped transverse groove 163 formed in the upper edge of the respective supports receive the armature shaft and sustain the axis by the core co-axial to the longitudinal axis of sleeve 151. A pair of spaced pivoted locks 164 removably anchor support 162 in the proper position onto base 158 to permit assembly and removal of the armature core relative to sleeve 151. With this arrangement, it will be observed from FIGS. 25 and 26 that when the core 140 is properly sustained within non-magnetic sleeve 151, periphery of core 140 is disposed adjacent to inner surface 152 of non-magnetic sleeve 151.

In order to direct an energy surge of preselected magnitude to coils 147, they are serially connected across output terminal connectors 48, 49 of energy surge source 50 by leads 166, 167 which in turn are attached to a pair of brush contactors 168, 169 held firmly against two of the commutator bars 150 located 180 degrees apart. The brushes are preferably formed of a silver composition and have an edge held tightly against the bars by pressure applying screws 171 in threaded insulated holders 172. The holders 172 project radially through openings 173 extending entirely through the sleeve at its end facing support 159 and are secured in place by set-screws 174. In FIGS. 25, 28 the letter A designates the initial positions of the coil turns as they appear before the method of the invention is carried out.

Preferably, two high surges of electrical energy of preselected magnitude are directed into the coils to effect the desired coil turn transformation from positions A to intermediate positions B where the turns in the slot are all within the confines of slot insulators 148 (FIG. 29) and finally into the positions shown by the full lines at C. Since this sequence of operation and the reasons for it have been detailed with respect to the exemplification of FIGS. 8–13, only a brief discussion will be included here.

During the coil excitation, a current surge will flow through the coils in the direction indicated by the arrows in FIG. 27. Eddy current flow is created in adjacent parts of rigid non-magnetic sleeve 151, near surface 152, and opposing magnetic fields are established which together with the current flow, produce forces on the turn side portions in a direction away from sleeve 151, that is, toward the bottom of the core slots 147. In consequence of these forces, the coil turns are transferred rapidly away from the non-magnetic sleeve structure and are compacted into a tight bundle within the slots as shown by the fragmentary view of FIG. 29 which is typical for all slots. In view of the particular overlapping relation of the coil end turn portions, especially at the end of the core facing support 162, the turns are compacted to a degree even were they not surrounded by sleeve 151. Thus, for this exemplification, the non-magnetic material may be disposed merely next to the circumference of the core 140 to derive beneficial results from my invention.

It should be obvious from the coil deployment of FIG. 27 that the energy surge could equally as well be applied to coils 147 before they have been connected to the individual commutator bars 150, in which case, the leads 166, 167 may be joined to the terminal ends of the serially connected coils. Moreover, from all of the preferred embodiments disclosed herein, it will be understood that in the practice of my invention, rather than employing the rigid non-magnetic and electrically conductive structures shown and described, any material fixedly held in the proper location relative to the coil turns to be transformed which is capable of conducting transient eddy current flow or the equivalent at a surface facing the turns to afford the desired effect may be used.

FIGURE 30 displays a simplified circuit diagram of one type of electrical energy surge source which may be used in the practice of the present invention. This source is shown in block form and identifiied by numeral 50 in the previously described figures. By way of illustration, the source includes a bank of three parallel connected storage capacitors 181, 182, and 183 chargeable as a unit to various regulated voltage levels, and are subsequently discharged to provide a high electrical energy surge of preselected magnitude by switching an ignition 184 into conduction. The components of the circuit may be mounted in a housing or casing (not shown) for convenience and connected to a suitable alternating current supply, such as the well-known commercially available 120 volt, 60 cycle through input terminals 185, 186 which in the actual circuit consisted of a plug for use with a grounded type of receptacle. A main on-off switch 187 of standard construction is provided to initially energize certain components of the circuit. It will be observed from FIG. 30 that with switch 187 in the closed position, primary windings 188, 189 of the filament transformers 191, 192 are immediately activated. It will also be seen that the circuit which includes pushbutton switch 51 and leads 190, 193 is not originally energized until after an interval of time as determined by thermostatic time delay switch 194. In this way, the grids of the rectifier tubes 195, 196, and 197 are allowed to warm up for at least 30 seconds before plate voltage is applied to the rectifier tubes, which are of the liquid vapor type, necessitating the warm-up period.

In order to regulate the voltage level on the bank of capacitors 181, 182, 183, adjustable arm 198 of the control auto-transformer 199 is movable for regulating the voltage to the desired level. In the application of this energy source to my invention, the magnitude of the high energy surge provided in the individual exemplifications; e.g., main field winding of stator core 80, shown connected to the output terminal connectors 48, 49 in FIG. 30, may be readily selected by controlling or regulating the voltage level which the capacitors 181, 182, and 183 are charged.

As previously noted, the charging of the capacitor bank is initiated by depression of pushbutton switch 51. This momentary closing of switch 51 causes the normally open relay 201 to close, whereupon the coils of the two normally closed relays 202 and 203 are also energized for supplying alternating current across the autotransformer 199. When relay 201 closes, time delay relay 204 is also actuated and after a time delay determined by the setting on the control 206, relay 207 is operated to provide a positive potential applied at starter rod 208 of ignitron 184 which is then switched to a conductive state. Ignitrons 184 and 209 illustrated in the circuit are mercury-pool cathode-arc rectifiers with a starter rod immersed in the mercury pool. When a positive potential is supplied at the starter rod of the ignitrons, sparking occurs at the junction of the rod and mercury pool causing the formation of a cathode spot, with the anode passing current in the usual way.

With ignitron 184 in a conductive state, time delay relay 204 momentarily opens and contacts 210 to restore relays 201, 202, and 203 to their normally open positions after an interval of time. The illustrated time delay relay is of the commercially available type, being driven by a small synchronous motor coupled to a gear train. At the termination of the time delay interval, the contacts of a microswitch close and energize relay 207.

It should be noted at this time that when time delay relay 204 and control autotransformer 199 have been energized, the output of the control autotransformer is applied across the primary winding 211 of step-up autotransformer 212. To limit the peak current, a choke 213 is connected in series with primary winding 211. To furnish a full wave rectified current for charging the capacitors 181, 182 and 183, the pair of high voltage rectifiers 195 and 196 are connected in the secondary circuit of step-up transformer 212.

The secondary winding 214 is in turn tapped at its center tap 215 so that the voltages between each end of the secondary winding 214 is of such polarity that its upper end is positive with respect to the center tap 215, the plate of the high voltage rectifier 195 becomes positive with respect to its cathode. The rectifiers 195 and 196 alternately conduct in conformance with the changing polarity of the input voltage. By connecting a voltmeter 217 in series with a multiplier resistor 218 across the bank of capacitors, a voltage reading may readily be taken of the voltage level on the capacitor bank.

The full wave rectified output is additionally utilized for the purpose of charging a capacitor 219 through a voltage divider consisting of resistors 221 and 222. Approximately four-tenths of the full wave rectified voltage is applied across the capacitor 219. A resistor 223 is connected in the discharge circuit of the capacitor 219 to control its discharge rate when the relay 207 is actuated to the closed position.

The following is a brief description of the way in which the foregoing described energy source of FIG. 30 may be utilized in the practice of my invention. The adjustable arm 198 on the control autotransformer 199 is initially set to provide a selected voltage between the center point 215 and one end of the secondary winding 214 of the step-up transformer 212. For a bank of capacitors having the fixed capacitance of 360 microfarads previously referred to and a preselected surge of electrical energy of 480 joules for transforming the winding coils of the illustrated core 80 from positions A to B in FIG. 11, the arm should be set to charge the bank with a selected voltage of 1622 volts. With main switch 187 closed and the filament transformers energized for an interval of approximately thirty seconds, the grids of the high voltage rectifiers become warmed up. The time delay switch 194 closes, supplying power to leads 190 and 193. The circuit is now in stand-by condition, and the capacitor bank can be charged by the operator at his discretion by depression of the button for switch 51.

Once the capacitors 181, 182, and 183 have been charged to the selected voltage level and the 15 second time delay period has terminated, relay 207 causes the capacitor 219 to discharge through the starter rod 208 of ignitron 184. When the ignitron has been triggered into a conductive condition, it functions as a switch and discharges the capacitor bank (181, 182, 183) which directs the preselected energy surge to the main field winding of core 80 illustrated in FIG. 30 through terminal connectors 48 and 49.

When the polarity of the voltage across the terminal connectors 48, 49 reverses, the voltage on the plate of the high voltage rectifier 197 becomes positive, and it is also triggered into conduction. With the rectifier 197 conducting, a positive potential is applied at the starter rod 208 of ignitron 209, which subsequently fires. Consequently, the reverse current flow shunts the capacitor bank.

If successive high energy surges are desired, the adjustable arm 198 on the control autotransformer 199 may be moved to regulate the selected voltage level on the capacitor bank which will give a surge of preselected magnitude. If a time delay interval of greater duration is required than that used for the first surge, time delay control 205 can be adjusted to provide a time interval corresponding to the new voltage level. Pushbutton switch 51 is once again depressed and the capacitors 181, 182, and 183 of the capacitor bank are charged and finally discharged after a prescribed time interval to provide a second high electrical energy surge through the winding coils. This cycle of operation may be repeated for each subsequent surge of energy.

The following is an illustrative example of components for the energy surge source 50 which may be incorporated in the aforedescribed circuit of FIG. 30:

| Component identification: | Specifications of the components |
|---|---|
| Control autotransformer 199 | General Electric 9H60LA10X. |
| Step-up transformer 212 | Stancor P-8034. |
| Choke 213 | Stancor C-2688, −010 henries. |
| Rectifiers 195, 196, 197 | Mercury vapor rectifiers 872A. |
| Filament transformer 191 | Stancor 5 volt, 15 amperes P-6433. |
| Filament transformer 192 | Stancor 5 volt, 10 amperes P-6135. |
| Ignitrons 184, 209 | GL-5550 Ignitron. |
| Capacitors 181, 182, 183 | 210 microfarads, 5000 volts. |
| Capacitor 219 | .05 microfarad, 2000 volts. |
| Resistor 218 | 5 megohms. |
| Resistor 221 | 2 megohms. |
| Resistor 222 | 3 megohms. |
| Resistor 223 | 20 megohms. |

It will be recognized by those skilled in the art, of course, that other types of electrical energy surge sources can and have been employed in the practice of the present invention. Whatever the source, it should be capable of supplying at least one high surge of electrical energy having a preselected magnitude to one or more coils, controlled by the given application as previously disclosed.

It will be apparent to those skilled in the art that in connection with motor winding coils, my improved method effects the desired transformation of the coil turns into a final desired configuration in a rapid and economical fashion without requiring mechanical devices that engage the windings in an attempt to force-back and compact the side and end turn portions of the coils. The present invention accomplishes the coil transformation by an improved procedure resulting in excellent control of the final configuration of the coil and minimizes possible injury to the winding insulation. Without limiting the meaning of the term, "transformation" as used herein may include any one or more of the following: compaction of the coil turns into a tight bundle, change of relative positions of the turns or of the coil itself relative to the coil accommodating structure, change of coil contour, and force-back of the end turn portions. Although my method is especially significant and beneficial when directed toward the transformation of motor winding coils, it also has certain advantages when utilized for other applications involving electrical coils of electromagnetic and electrical inductive devices in general, where a particular coil transformation is desired.

While in accordance with the patent statutes, I have described what at present are considered to be the preferred embodiments of my invention, it will be obvious to those skilled in the art that numerous changes and modifications may be made therein without departing from the invention and it is therefore aimed in the appended claims to cover all such equivalent variations as fall within the true spirt and scope of the invention.

What I claim as new and desire to secure by Letters Patent of the United States is:

1. A method of arranging a turn portion of an electrical coil, formed of a number of individually movable conductor turns, in a predetermined position next to a wall of turn accommodating means in a magnetic core, with the turn portion having an initial position in the turn accommodating means located further away from the wall than the predetermined position, said method comprising the steps of: disposing electrically conductive material, capable of conducting eddy currents, in the vicinity of the turn portion in its initial position; and generating at least one surge of electrical current in the conductor turns such that the current flows through the individual conductor turns of the electrical coil in the same direction by the application of a surge of electrical energy of a predetermined magnitude to the conductor turns, with the current flow establishing a magnetic field adjacent the turn portion in the region of the core at the turn accommodating means and with transient eddy currents being established in the electrically conductive material producing a reaction with the magnetic field to create forces which effect transfer of the turn portion from its initial position into its predetermined position next to the wall of the turn accommodating means.

2. A method of arranging a coil portion of an electrical coil, formed of a number of individually movable conductor turns, in a predetermined position next to a wall of turn accommodating means in a magnetic core, with the coil portion having an initial position located further away from the wall than the predetermined position, said method comprising the steps of: disposing rigid electrically conductive material in the vicinity of the coil portion in its initial position; applying a first surge of electrical energy of a preselected magnitude in the coil turns to establish a flow of current through the individual conductor turns of the coil portion in the same direction and to establish transient eddy current flow in the non-magnetic material next to the initial position of the coil portion; the current flow in the conductor turns and the transient eddy current flow in the generally non-magnetic and electrically conductive material producing magnetic fields and forces acting on the coil portion to effect transfer of the coil portion from its initial position into a second position; and applying a second surge of electrical energy to the conductor turns greater in magnitude than the first surge to establish current flow through the coil portion and in the generally non-magnetic and electrically conductive material thereby to create a magnetic field and cause forces to act on the coil portion for effecting transfer of the coil portion from the second position to the predetermined position next to the wall of the turn accommodating means.

3. A method of coil transformation where electrical coils have side portions received in coil accommodating slots of a magnetic core formed of ferromagnetic material, with the coils being formed of a number of individual conductor turns comprising the steps of: placing electrically conductive material in a generally fixed position adjacent the coil accommodating slots; and effecting transformation of the conductor turns into coils of the desired configuration by generating at least one surge of electrical energy having a predetermined magnitude to the conductor turns such that the electrical energy surge produces current flow in the conductor turns and in the electrically conductive material thereby creating magnetic fields and forces which act on the conductor turns to transfer at least the coil side portions away from the electrically conductive material toward the bottom of the slots and to transform the conductor turns into coils of the desired configuration.

4. A method of compacting a coil portion of an electrical coil, formed of a number of individually movable and insulated conductor turns, in turn accommodating means of a magnetic core, with the coil portion having an initial position in the turn accommodating means, said method comprising the steps of: arranging generally non-magnetic and electrically conductive material in the vicinity of the initial position of the coil portion; applying a first surge of electrical energy of a preselected magnitude, below the intensity at which the turn insulation is deleteriously affected, to the coil turns to establish a flow of current through the individual conductor turns of the coil portion in the same direction and to create transient eddy current flow in the generally non-magnetic and electrically conductive material next to the initial position of the coil portion, the current flow in the coil turns and in the generally non-magnetic and electrically conductive material producing interacting magnetic fields creating forces to effect transfer of the coil portion from its initial position to a second position in the turn accommodating means; and applying a second surge of electrical energy to the coil turns greater in magnitude than the first surge but still below the intensity at which the turn insulation is deleteriously affected for producing a surge of current in said coil portion and a magnetic field to create forces acting thereon thereby effecting further compaction of the coil portion next to a wall of the turn accommodating means.

5. A method of compacting a dynamoelectric machine stator winding formed of a plurality of electrical coils connected in circuit relation and carried by a magnetic core, the core being formed of ferromagnetic material having a bore and a number of circumferentially spaced apart slots extending axially between the respective end faces of the core, with each coil being defined by a number of conductor turns having a pair of spaced apart side portions accommodated in a preselected pair of slots and an end portion projecting axially beyond each core end face joining the associated side portions together, the method comprising the steps of: placing a generally non-magnetic rigid structure, capable of conducting eddy currents, into the bore in the vicinity of the core, with said structure extending entirely through the core for substantially the axial length of the winding; and applying at least one surge of electrical energy of a predetermined magnitude to the winding such that current flows through the conductor turns of a given coil in the same direction to create flux in the vicinity of the coil turns, and transient eddy current flows in said structure adjacent the core to create flux in opposition to that of the coils, with the interaction of the fluxes transferring the turns of the windings toward the bottom of the slots away from the generally non-magnetic structure thereby resulting in compaction of the coils.

6. A method of compacting a plurality of electrical coils carried by a dynamoelectric machine stator core, with the stator core being formed of ferromagnetic material having a bore and a number of circumferentially spaced apart teeth sections around the bore to provide a corresponding number of open-ended slots extending axially between a pair of end faces of the core, and with each coil being defined by a number of individually movable turns of insulated wire conductors having a pair of spaced apart side portions accommodated in a preselected pair of slots and an end portion projecting axially beyond each core end face joining the associated side portions together, the method comprising the steps of: placing diamagnetic material into the bore of the core, with said material extending entirely through the core and radially beneath the coil end portions and with electrical insulation disposed between the core and said diamagnetic material; applying a first surge of electrical energy of a predetermined magnitude concurrently to substantially all of the coil turns to establish a magnetic field initially across coil accommodating slots and adjacent teeth sections thereto, a magnetic field at the coil end turns, and transient eddy currents in said diamagnetic material to intensify the density of the magnetic fields in the vicinity of the coil turns, with the interaction of the magnetic fields and of the diamagnetic material effecting transfer of the turns toward the bottom of the slots and away from the diamagnetic material; and applying at least a second surge of electrical energy of greater magnitude than the first surge but below the intensity at which the insulation of the individual conductors is deleteriously affected, with the energy producing an interaction between the coil turns and the diamagnetic material to effect further movement of the coil side portions toward the bottom walls of the slots and of the end portions radially beyond the bottom walls of the slots and axially toward their associated end faces of the core.

7. A method of compacting at least one electrical coil formed of a number of movable conductor turns comprising the steps of: arranging selected portions of the coil in predetermined adjacent positions to electrically conductive material; and effecting compaction of the selected coil portions by generating at least one surge of electrical energy having a predetermined magnitude to the coil turns, with the energy producing current flows in and a flux interaction between the electrically conductive material and the selected portions to create forces acting upon said selected portions thereby achieving compaction thereof.

8. A method of transforming a number of movable turns of individually insulated conductors into an electrical coil having a desired overall configuration comprising the steps of: arranging the coil turns and a generally non-magnetic structure of electrically conductive material in the vicinity of one another; and effecting the desired overall configuration of the electrical coil by generating at least one surge of electrical energy having a predetermined magnitude to the coil turns below the intensity at which the insulation of the conductors is deleteriously affected, with said at least one surge of electrical energy producing current flow in the coil turns and magnetic flux in the region of the coil turns and of the generally non-magnetic structure thereby causing a force interaction between the coil turns and the generally non-magnetic structure to effect transformation of said turns into a coil having the desired overall configuration.

9. A method of transforming selected and individually movable portions of a number of conductor turns wound from a continuous length of electrically conductive material into an electrical coil having a desired overall configuration, the method comprising the steps of: arranging the selected portions of the conductor turns in first positions next to other electrically conductive material; and transferring the selected turn portions into second positions where said turn portions are respectively disposed further away from said other electrically conductive material than at said first positions by supplying at least one surge of electrical energy having a preselected magnitude directly to said conductor turns, with the at least one surge of electrical energy producing current flows in said selected portions of the conductor turns and in said other electrically conductive material resulting in an interaction of magnetic flux between the selected turn portions and said other electrically conductive material thereby causing the selected turn portions to travel from the first to the second positions whereby the conductor turns are transformed into the electrical coil having the desired overall configuration.

10. A method of changing the position of selected and individually movable portions of a number of conductor turns wound from a continuous length of electrically conductive material into a coil, the method comprising the steps of: arranging the selected portions of the conductor turns in first positions next to a rigid structure of nonmagnetic material capable of conducting transient eddy currents and in predetermined spacial relation to rigid ferromagnetic material; and transferring the selected turn portions into second positions respectively disposed further away from the rigid structure than said first positions and disposed nearer to said ferromagnetic material than when in said first positions by applying at least one surge of electrical energy having a preselected magnitude directly to said conductor turns, with the at least one electrical energy surge creating a surge of current flow in the turns and a transient eddy current flow in the rigid structure to produce opposing magnetic fields of flux resulting in an interaction between the selected turn portions and the rigid structure thereby causing the selected turn portions to travel from the first to the second positions, and with the ferromagnetic material providing a positive path for the passage of flux for augmenting the interaction of the opposing fields.

11. A method of transforming a number of movable conductor turns wound from a continuous length of electrically conductive material into an electrical coil having a predetermined overall configuration, the method comprising the steps of: encircling a rigid structure of non-magnetic material with selected turn portions adjacent thereto and arranging other rigid structure of non-magnetic material adjacent to other portions outside the confines of the turns; and transferring the selected turn portions away from the respective adjacent rigid structures by applying at least one surge of electrical energy of predetermined magnitude directly to said conductor turns; said at least one surge of electrical energy producing current flows in said conductor turns and in said respective adjacent rigid structures to establish a magnetic field and force an interaction between the selected turn portions and the adjacent rigid non-magnetic structure thereby causing the selected turn portions to assume positions away from their associated structure and provide a desired overall configuration.

12. A method of transforming end turn portions of at least one electrical coil, carried by a plurality of slots of a dynamoelectric machine stator core, into a final desired configuration, with the stator core being formed of ferromagnetic material having a bore with a number of coil side portions accommodated in the slots and with coil end turn portions projecting axially beyond at least one end face of the coil, the method comprising the steps of: disposing non-magnetic material capable of conducting eddy currents near the end turn portions; applying at least one surge of electrical energy of a predetermined magnitude to the coil turns to establish current flow through the individual conductor turns in the same direction and to produce transient eddy current flow in the material in the vicinity of the coil end turn portion, with the current flows creating magnetic fields and forces acting upon the end turn portions to transfer them away from the non-magnetic material; and controlling the final desired configuration of the end turn portions as the at least one surge of electrical energy is being applied to the coil turns.

13. A method of forcing back end turn portions of at least one electrical coil carried by a dynamoelectric machine core into a desired position relative to the core, with the core being formed of ferromagnetic material having at least one end face and a number of slots, and with each coil being defined by a number of individually movable turns of conductors having a pair of spaced apart side portions accommodated in a pair of slots and an end turn portion projecting axially beyond the one end face, the method comprising the steps of: placing electrically conductive material adjacent the coil end turn portions; and effecting a desired force-back of the end turn portions by generating at least one surge of electrical energy of a predetermined magnitude to the coil turns to establish current flows in said end turn portions and in said electrically conductive material as well as magnetic fields in the vicinity of the end turn portions and in adjacet regions of the core to create opposing forces between the end turn portion and the electrically conductive material thereby forcing back the end turn portion away from the electrically conductive material and into the desired position.

14. A method of forcing back end turn portions of a plurality of electrical coils carried by a dynamoelectric machine stator core, with the stator core being formed of ferromagnetic material having a bore and a number of circumferentially spaced apart teeth sections around the bore to provide a corresponding number of open-ended slots extending axially between a pair of end faces of the core, and with each coil being defined by a number of individually movable turns of insulated wire conductors having a pair of spaced apart side portions accommodated in a pair of slots and end turn portions projecting axially beyond the respective end faces joining the associated side portions together, the method comprising the steps of: disposing rigid generally non-magnetic material capable of conducting eddy currents radially beneath the coil end turn portions; and applying at least one surge of electrical energy of a predetermined magnitude to the coil turns to establish current flow through the individual conductor turns of a given end turn portion in the same direction, and to produce transient eddy current flow in said material in the vicinity of the coil end turn portions, with the currents in the end turn portions and in the non-magnetic material creating magnetic fields and opposing forces which act upon said end turn portions thereby effecting transfer of the end turn portions radially away from the non-magnetic material and axially toward the associated end faces of the core.

15. A method of transforming at least one electrical coil having relatively movable turns from one configuration to a desired configuration, with the at least one electrical coil including side turn portions accommodated in selected slots of a slotted member and having end turn portions extending beyond the selected slots, each selected slot of the slotted member having an entrance in communication therewith, the method comprising the steps of: disposing a structure next to the selected slot entrances; and effecting a change in the configuration of the at least one electrical coil from the one to the desired configuration as the structure is maintained next to the entrances, by generating at least one surge of electrical energy in the at least one electrical coil of sufficient magnitude to produce current flow in the at least one electrical coil and a magnetic field in the vicinity thereof to furnish a reaction for attaining the desired transformation, with said structure retaining the relatively movable turns of the side turn portions in the slots as the at least one electrical coil is being transformed into the desired configuration.

16. The method set forth in claim 15 wherein the structure has insulation positioned next to the selected slot entrances during the change in configuration of the at least one electrical coil to reduce potential arcing between the turns and the structure as the at least one electrical energy surge is being generated in the at least one electrical coil.

17. A method of transforming at least one electrical coil formed of a number of conductor turns from one configuration to a desired configuration, with the at least one electrical coil including side turn portions received in selected slots of a slotted ferromagnetic core and having end turn portions extending beyond the selected slots, and with each selected slot of the slotted core including an entrance in communication with an outer surface of the core, the method comprising the steps of: positioning a structure having an insulated region thereof next to the outer surface in the vicinity of the selected slot entrances and an insulated region next to the end turn portions when the coil is in the one configuration; and producing a change in the configuration of the at least one electrical coil from the one to the desired configuration while the insulated regions of the structure are respectively maintained in the vicinity of the entrances and next to the end turn portions, said change being attained by generating at least one surge of electrical energy in the at least one electrical coil of sufficient magnitude to produce current flow in the at least one electrical coil thereby creating a magnetic field and forces for effecting the transformation thereof into the desired configuration, while the insulated regions of the structure retain the side turn portions in the slots during such transformation and temporarily hold the end turn portions generally at a given location relative to the core when the at least one electrical coil is in the one configuration.

18. The method set forth in claim 17 wherein the structure further includes non-magnetic electrically conductive material and as the at least one electrical energy surge is being generated in said at least one electrical coil, the non-magnetic electrically conductive material intensifies the forces acting on the at least one coil to effect the transformation thereof into the desired configuration.

References Cited

UNITED STATES PATENTS

| | | | |
|---|---|---|---|
| 2,377,175 | 5/1945 | Peer | 318—220 |
| 2,506,173 | 5/1950 | Polard | 29—205 |
| 2,691,306 | 10/1954 | Beams et al. | 310—166 |
| 2,976,907 | 3/1961 | Harvey | 153—10 |
| 3,092,165 | 6/1963 | Harvey | 153—2 |
| 3,115,857 | 12/1963 | Pfanner | 113—44 |

OTHER REFERENCES

Furth et al.: Scientific American, vol. 198, February 1958, pp. 28–33.

Seely: Introduction to Electromagnetic Fields, 1958, McGraw-Hill, pp. 269–274.

Moulin: The Principles of Electromagnetism, 2nd ed., 1950, Oxford At The Clarendon Press, pp. 234 and 235.

Crow: Design, Construction and Operating Principles of Electromagnets for Attracting Copper, Aluminum and Other Non-Ferrous Metals; 1951; The Scientific Book Publishing Co., p. 22.

Geary: Magnetic and Electric Suspensions, 1964, SIRA Research Report R 314; pp. 61–65.

JOHN F. CAMPBELL, *Primary Examiner.*

J. L. CLINE, *Assistant Examiner.*